US009055093B2

(12) United States Patent
Borders

(10) Patent No.: US 9,055,093 B2
(45) Date of Patent: Jun. 9, 2015

(54) METHOD, SYSTEM AND COMPUTER PROGRAM PRODUCT FOR DETECTING AT LEAST ONE OF SECURITY THREATS AND UNDESIRABLE COMPUTER FILES

(76) Inventor: Kevin R. Borders, Ypsilanti, MI (US)

( * ) Notice: Subject to any disclaimer, the term of this patent is extended or adjusted under 35 U.S.C. 154(b) by 1317 days.

(21) Appl. No.: 12/317,056

(22) Filed: Dec. 18, 2008

(65) Prior Publication Data
US 2009/0158430 A1     Jun. 18, 2009

Related U.S. Application Data

(63) Continuation-in-part of application No. 11/255,835, filed on Oct. 21, 2005, now Pat. No. 8,079,080.

(60) Provisional application No. 61/128,200, filed on May 20, 2008.

(51) Int. Cl.
*H04L 29/06* (2006.01)
*G06F 21/55* (2013.01)
*G06F 21/57* (2013.01)

(52) U.S. Cl.
CPC ....... *H04L 63/1408* (2013.01); *H04L 29/06557* (2013.01); *G06F 21/552* (2013.01); *G06F 21/577* (2013.01); *G06F 2221/2101* (2013.01); *H04L 63/0227* (2013.01)

(58) Field of Classification Search
None
See application file for complete search history.

(56) References Cited

U.S. PATENT DOCUMENTS

| | | | | |
|---|---|---|---|---|
| 5,828,833 A * | 10/1998 | Belville et al. | | 726/11 |
| 5,951,649 A * | 9/1999 | Dobbins et al. | | 709/238 |
| 6,219,706 B1 * | 4/2001 | Fan et al. | | 709/225 |
| 6,519,703 B1 | 2/2003 | Joyce | | |
| 6,671,811 B1 | 12/2003 | Diep et al. | | |
| 6,681,331 B1 | 1/2004 | Munson et al. | | |
| 6,708,212 B2 | 3/2004 | Porras et al. | | |
| 6,772,345 B1 | 8/2004 | Shetty | | |
| 6,801,940 B1 | 10/2004 | Moran et al. | | |
| 7,096,498 B2 * | 8/2006 | Judge | | 726/22 |
| 7,146,505 B1 * | 12/2006 | Harada et al. | | 713/185 |
| 7,818,800 B1 * | 10/2010 | Lemley et al. | | 726/22 |
| 7,849,507 B1 * | 12/2010 | Bloch et al. | | 726/22 |
| 7,904,642 B1 * | 3/2011 | Gupta et al. | | 711/108 |
| 7,962,950 B2 * | 6/2011 | Choo et al. | | 726/2 |

(Continued)

OTHER PUBLICATIONS

Pfleeger (Pfleeger et al. Securtiy in Computing, Third Edition, Dec. 2002, ISBN-10: 0-13-035548-8).*

(Continued)

*Primary Examiner* — Peter Poltorak
(74) *Attorney, Agent, or Firm* — Brooks Kushman P.C.

(57) ABSTRACT

Method, system and computer program product for detecting at least one of security threats and undesirable computer files are provided. A first method includes receiving a data stream which represents outbound, application layer messages from a first computer process to at least one second computer process. The computer processes are implemented on one or more computers. The method further includes monitoring the data stream to detect a security threat based on a whitelist having entries which contain metadata. The whitelist describes legitimate application layer messages based on a set of heuristics. The method still further includes generating a signal if a security threat is detected. A second method includes comparing a set of computer files with a whitelist which characterizes all legitimate computer files. The whitelist contains one or more entries. Each of the entries describe a plurality of legitimate computer files.

32 Claims, 7 Drawing Sheets

(56) References Cited

U.S. PATENT DOCUMENTS

| | | | |
|---|---|---|---|
| 8,566,919 B2* | 10/2013 | Meisel | 726/13 |
| 2002/0035628 A1 | 3/2002 | Gil et al. | |
| 2002/0133586 A1 | 9/2002 | Shanklin et al. | |
| 2002/0178384 A1* | 11/2002 | Elgressy et al. | 713/201 |
| 2003/0004688 A1 | 1/2003 | Gupta et al. | |
| 2003/0051026 A1* | 3/2003 | Carter et al. | 709/224 |
| 2003/0097590 A1* | 5/2003 | Syvanne | 713/201 |
| 2003/0159070 A1 | 8/2003 | Mayer et al. | |
| 2003/0212903 A1 | 11/2003 | Porras et al. | |
| 2003/0236652 A1 | 12/2003 | Scherrer et al. | |
| 2004/0021191 A1 | 2/2004 | Bradley | |
| 2004/0034794 A1 | 2/2004 | Mayer et al. | |
| 2004/0054925 A1 | 3/2004 | Etheridge et al. | |
| 2004/0083388 A1* | 4/2004 | Nguyen | 713/201 |
| 2004/0111531 A1* | 6/2004 | Staniford et al. | 709/246 |
| 2004/0114519 A1 | 6/2004 | MacIsaac | |
| 2004/0250124 A1 | 12/2004 | Chesla et al. | |
| 2004/0250134 A1 | 12/2004 | Kohler, Jr. et al. | |
| 2005/0021740 A1 | 1/2005 | Bar et al. | |
| 2005/0033989 A1 | 2/2005 | Poletto et al. | |
| 2005/0044212 A1* | 2/2005 | Lingafelt et al. | 709/224 |
| 2005/0044406 A1 | 2/2005 | Stute | |
| 2005/0076236 A1 | 4/2005 | Stephenson | |
| 2005/0080898 A1* | 4/2005 | Block | 709/225 |
| 2005/0108393 A1 | 5/2005 | Banerjee et al. | |
| 2005/0131835 A1* | 6/2005 | Howell | 705/64 |
| 2005/0144441 A1* | 6/2005 | Govindarajan | 713/160 |
| 2005/0262132 A1* | 11/2005 | Morita et al. | 707/102 |
| 2006/0037077 A1 | 2/2006 | Gadde et al. | |
| 2006/0064315 A1* | 3/2006 | Koch et al. | 705/1 |
| 2006/0075467 A1* | 4/2006 | Sanda et al. | 726/1 |
| 2006/0075472 A1* | 4/2006 | Sanda et al. | 726/3 |
| 2006/0085857 A1* | 4/2006 | Omote et al. | 726/24 |
| 2006/0095569 A1* | 5/2006 | O'Sullivan | 709/224 |
| 2006/0288420 A1* | 12/2006 | Mantripragada et al. | 726/25 |
| 2007/0033645 A1* | 2/2007 | Jones | 726/12 |
| 2007/0038677 A1* | 2/2007 | Reasor et al. | 707/200 |
| 2007/0094491 A1* | 4/2007 | Teo et al. | 713/153 |
| 2007/0124739 A1* | 5/2007 | Culbreth et al. | 719/320 |
| 2007/0261112 A1 | 11/2007 | Todd et al. | |
| 2008/0201278 A1* | 8/2008 | Muller et al. | 706/12 |
| 2009/0328187 A1* | 12/2009 | Meisel | 726/13 |
| 2011/0023096 A1* | 1/2011 | Xiao et al. | 726/5 |
| 2014/0283033 A1* | 9/2014 | Anand | 726/22 |

OTHER PUBLICATIONS

Whyte et al., "DNS-based Detection of Scanning Warms in an Enterprise Network", Aug. 2004, School of Computer Science, Carleton University, Ottawa, Canada.*
Vacca et al. Firewalls. Jumpstart for Network and System Administrators, ISBN: 1-55558-297-4, Dec. 2004.*
Office Action dated Mar. 19, 2009 from U.S. Appl. No. 11/255,835, filed Oct. 21, 2005.
Kruegel, Christopher, et al., A Multi-Model Approach to the Detection of Web-Based Attacks, Computer Networks: The International Journal Computer and Telecommunications Networking, vol. 48, Issue 5, 2005, pp. 717-738.
Erbacher, Dr. Robert F., Intrusion Detection Visualization and Software Architecture for the Detection of Competent Attacks, http://www.cs.usu.edu/~erbacher/publications/VFRP-Final Report-Erbacher-2004.pdf., pp. 3-19.
Wang, KE, et al., Anomalous Payload-based Network Intrusion Detection, http://www1.cs.columbia.edu/ids/publications/RAID-final.pdf.2004, pp. 1-17.
J. Giles and B. Hajek. An Information-theoretic and Game-theoretic Study of Timing Channels. IEEE Transactions on Information Theory, 48:2455-2477, Sep. 2003, pp. 1-24.
F. Heinz, J. Oster. Nstxd—IP Over DNS Tunneling Daemon. http://www.digipedia.pl/man/nstxd.7.html, Mar. 2005, pp. 1-3.
T. Kelly. Thin-Client Web Access Patterns: Measurements From a Cache-busting Proxy. Computer Communications, 25(4):357-366, Mar. 2002, pp. 1-9.

C. Kruegel and G. Vigna. Anomaly Detection of Web-based Attacks. Proceedings of the 10th ACM Conference on Computer and Communications Security (CCS), Washington, DC, Oct. 2003, pp. 1-11.
Microsoft Corporation. BitLocker Drive Encryption: Technical Overview. http://technet.microsoft.com/en-us/windowsvista/aa906017.aspx, Apr. 2008, pp. 1-12.
NetWitness Corporation. NetWitness—Total Network Knowledge. http://www.netwitness.com, Apr. 2008, pp. 1.
J. Newsome and D. Song. Dynamic Taint Analysis for Automatic Detection, Analysis, and Signature Generation of Exploits on Commodity Software. Proceedings of the 12th Annual Network and Distributed System Security Symposium (NDSS), San diego, CA, Feb. 2005, pp. 1-17.
A. Nguyen-Tuong, S. Guarnieri, D. Greene, J. Shirley, and D. Evans. Automatically Hardening Web Applications Using Precise Tainting. Proceedings of the 20th IFIP International Information Security Conference, Makuhari Messe, Chiba, Japan, Jun. 2005, pp. 1-12.
H. Niksic. GNU Wget.—The Noninteractive Downloading Utility. http://www.gnu.org/software/wget/, Sep. 1998, pp. 1.
National Security Agency. Security-enhanced Linux. http://www.nsa.gov/selinux, Apr. 2008, pp. 1.
J. Oberheide, E. Cookie, and F. Jahanian. Rethinking Antivirus: Executable Analysis in the Network Cloud. Proceedings of the 2nd USENIX Workshop on Hot Topics in Security (HOTSEC '07), Boston, MA, Aug. 2007, pp. 1-5.
OSCAR Protocol for AOL Instant Messaging. http://dev.aol.com/aim/oscar/, Apr. 2008, pp. 1-47.
V. Paxson. Bro: A System for Detecting Network Intruders in Real-time. Proceedings of the 7th USENIX Security Symposium, Jan. 1998, pp. 1-18.
Y. Zhang and V. Paxson. Detecting Backdoors. Proceedings of the 9th USENIX Security Symposium, Aug. 2000, pp. 1-15.
P. Proctor, R. Mogull, and E. Quellet. Magic Quadrant for Content Monitoring and Filtering and Data Loss Prevention. Gartner RAS Core Research Note, G00147610, Apr. 2007, pp. 1-17.
R. Richardson. CSI Computer Crime and Security Survey. 2007, pp. 1-30.
M. Roesch. Snort—Lightweight Intrusion Detection for Networks. Proceedings of the 13th USENIX Systems Administration Conference (LISA), Seattle, WA, 1999, pp. 1-10.
A. Roshal. WinRAR Archiver, a Powerful Tool to Process RAR and ZIP Files. http://www.rarlab.com/, Apr. 2008, pp. 1.
S. Castro. How to Cook a Covert Channel. hakin9, http://www.grayworld.net/ projects/ cooking_channels/ hakin9_cooking_channels_en.pdf, Jan. 2006, pp. 1-8.
M. Christodorescu, S. Jha, S. Seshia, D. Song, and R. Bryant. Semantics-aware Malware Detection. Proceedings of the 2005 IEEE Symposium on Security and Privacy, May 2005, pp. 1-15.
D. Cid. OSSEC Open Source Host-based Intrusion Detection System. http://www.ossec.net/, Apr. 2008, pp. 1-2.
R. Dingledine, N. Mathewson, and P. Syverson. Tor: The Second-generation Onion Router. Proceedings of the 13th USENIX Security Symposium, Aug. 2004, pp. 1-17.
B. Duska, D. Marwood, and M. J. Feeley. The Measured Access Characteristics of World Wide Web Client Proxy Caches. Proceedings of USENIX Symposium on Internet Technology and Systems, Dec. 1997, pp. 1-14.
A. Dyatlov and S. Castro. Wsh 'Web Shell'. http://www.gray-world.net/ pr_wsh.shtml, Mar. 2008, pp. 1.
G. Fisk, M. Fisk, C. Papadopoulos, and J. Neil. Eliminating Steganography in Internet Traffic with Active Wardens. Proceedings of the 5th International Workshop on Information Hiding, Oct. 2002, pp. 1-17.
J. Foster, T. Terauchi, and A. Aiken. Flow-sensitive Type Qualifiers. Proceedings of the ACM SIGPLAN Conference on Programming Language Design and Implementation (PLDI), Berlin, Germany, Jun. 2002, pp. 1-12.
T. Garfinkel, B. Pfaff, J, Chow, M. Rosenblum, D. Boneh. Terra: a Virtual Machine-based Platform for Trusted Computing. Proceedings of the Nineteenth ACM Symposium on Operating Systems Principles (SOSP), Bolton Landing, NY, Oct. 2003, pp. 1-14.

(56) References Cited

OTHER PUBLICATIONS

RSA Security Inc. RSA Data Loss Prevention Suite—Solutions Brief. http://www.rsa.com/products/EDS/sb/DLPST_SB_1207-lowres.pdf, 2007, pp. 1-8.

R. Sailer, X. Zhang, T. Jaeger, and L. Doorn. Design and Implementation of a TCG-based Integrity Measurement Architecture. In Thirteenth Usenix Security Symposium, pp. 223-238, 2004, pp. 1-17.

Sandvine, Inc. Sandvine—Intelligent Broadband Network Management. http://www.sandvine.com, Apr. 2008., pp. 1.

S. Servetto and M. Vetterli. Communication Using Phantoms: Covert Channels in the Internet. Proceedings of the IEEE International Symposium on Information Theory, Jun. 2001, pp. 1.

G. Vigna, W. Robertson, and D. Balzarotti. Testing Network-Based Intrusion Detection Signatures Using Mutant Exploits. Proceedings of the 11th ACM Conference on Computer and Communications Security (CCS), Washington, DC, Oct. 2004, pp. 1-10.

Vontu, Inc. Vontu—Data Loss Prevention, Confidential Data Protection. http://www.vontu.com, Apr. 2008, pp. 1.

WinZip International LLC. WinZip—The Zip File Utility for Windows. http://www.winzip.com/, Apr. 2008, pp. 1.

P. Barford, A. Bestavros, A. Bradley, and M. Crovella. Changes in Web Client Access Patterns: Characteristics and Caching Implications. BU Computer Science Technical Report, BUCS-TR-1998-023, 1998, pp. 1-30.

T. Berners-Lee, R. Fielding, and H. Frystyk. Hypertext Transfer Protocol-HTTP/1.0. Internet Engineering Task Force, May 1996. RFC 1945 (http://www.ietf.org/rfc/rfc1945.txt), pp. 1-61.

A. Dyatlov and S. Castro. Exploitation of Data Streams Authorized by a Network Access Control System for Arbitrary Data Transfers: Tunneling and Covert Channels Over the HTTP Protocol, pp. 1-35, Jun. 2003.

V. Gligor. A Guide to Understanding Covert Channel Analysis of Trusted Systems. National Computer Security Center Technical Report, NCSC-TG-030, Ft. George G. Meade, MD, Nov. 1993, pp. 1-95.

J. Gray III. Countermeasures and Tradeoffs for a Class of Covert Timing Channels. Hong Kong University of Science and Technology Technical Report, 1994, pp. 1-28.

J. Wray. An Analysis of Covert Timing Channels. Proceedings of the 1991 IEEE Symposium on Security and Privacy, Oakland, CA, May 1991, pp. 2-7.

K. Ahsan. Covert Channel Analysis and Data Hiding in TCP/IP. Master's Thesis, University of Toronto, 2000, pp. 1-134.

K. Ahsan and D. Kundur. Practical Data Hiding in TCP/IP. Proceedings of the ACM Workshop on Multimedia Security, Dec. 2002, pp. 1-8.

S. Axelsson. The Base-rate Fallacy and the Difficulty of Intrusion Detection. ACM Transactions on Information and System Security, 3(3):186-205, Aug. 2000, pp. 1-20.

K. Borders and A. Prakash. Web Tap: Detecting Covert Web Traffic. Proceedings of the 11th ACM Conference on Computer and Communications Security (CCS), Washington, DC, Oct. 2004, pp. 1-11, pp. 1-11.

K. Borders, A. Prakash, M. Zielinski. Spector: Automatically Analyzing Shell Code. Proceedings of the 23rd Annual Computer Security Applications Conference (ACSAC), Miami, FL, Dec. 2007, pp. 1-14.

Sheila L. Brand. DoD 5200.28-STD Department of Defense Trusted Computer System Evaluation Criteria (Orange Book). National Computer Security Center, Dec. 1985, pp. 1-94.

D. Brumley, J. Newsome, D. Song, H. Wang, and S. Jha. Towards Automatic Generation of Vulnerability-based Signatures. Proceedings of the 2006 IEEE Symposium on Security and Privacy, pp. 2-16, 2006.

D. Brumley, J. Caballero, Z. Liang, J. Newsome, and D. Song. Towards Automatic Discovery of Deviations in Binary Implementations with Applications to Error Detection and Fingerprint Generation. Proceedings of the 16th USENIX Security Symposium, Boston, MA, Aug. 2007, pp. 1-27.

J. Caballero, H. Yin, Z. Liang, and D. Song. Polyglot: Automatic Extraction of Protocol Message Format Using Dynamic Binary Analysis. Proceedings of the 14th ACM Conference on Computer and Communications Security (CCS), Washington, DC, Oct. 2007, pp. 1-15.

S. Cabuk, C. Brodley, and C. Shields. IP Covert Timing Channels: Design and Detection. Proceedings of the 11th ACM Conference on Computer and Communications Security (CCS), Washington, DC, Oct. 2004, pp. 1-10.

C. Cadar, V. Ganesh, P. Pawlowski, D. Dill, D. Engler. EXE: Automatically Generating Inputs of Death. In Proc. of the 13th ACM Conference on Computer and Communication Security, 2006, pp. 1-14.

R. Sailer, X. Zhang, T. Jaeger, and L. Doorn. Design and Implementation of a TCG-based Integrity Measurement Architecture. In Thirteenth Usenix Security Symposium, pp. 223-238, 2004, pp. 1-17.

G. Fisk, M. M Fisk, C. Papadopoulos, and J. Neil. Eliminating Steganography in Internet Traffic with Active Wardens. Proceedings of the 5th International Workshop on Information Hiding, Oct. 2002, pp. 1-17.

\* cited by examiner $$\text{Derivative of Delay} = \begin{cases} 0 & t < 2 \\ V(t) - V(t-1) & 2 \leq t \leq \mathit{Size}(V) \end{cases}$$

$$\text{Running Average} = \frac{8 * \sum_{i=1}^{a} \mathit{Derivative}(t-i)}{a} \quad 1 \leq t \leq \mathit{Size}(V)$$

FIG. 3

```
Hour:            | 1                      24
Mar 26(Fri)      | -----------XXXXXXXXX
Mar 27(Sat)      | -X----------------------
Mar 28(Sun)      | ------------------------
Mar 29(Mon)      | -----------XX--XXX-X
Mar 30(Tue)      | X-XX-------XXXXXXXXX
Mar 31(Wed)      | -----------XXXXXXXX-
```

FIG. 4

```
GET   /search?hl=en&q=security&btnG=Google+Search HTTP/1.1
Host:  www.google.com
User-Agent:  Mozilla/5.0  (Windows; U; Windows NT 5.1; en-US; rv:1.8.1.12)
      Gecko/20080201  Firefox/2.0.0.12
Accept:   test/xml,application/xml,application/xhtml+xml,text/html;q=0.9,
      text/plain;q=0.8,image/png,*/*;q=0.5
Accept-Language:   en-us,en;q=0.5
Accept-Encoding:   gzip,deflate
Accept-Charset:    ISO-8859-1,utf-8;q=0.7,*q=0.7
Keep-Alive:   300
Connection:   keep-alive
Referer:   http://www.google.com/
Cookie:  PREF=ID=0a2154dbc55bdbef:TM=1206244622:LM=1206244622:S=Ef4gtIW8gUX0zO0f
```

FIG. 5

```
 1  POST /███████  HTTP/1.1
 2  Host: www.webtapsecurity.com
 2  User-Agent: Mozilla/5.0 (Windows; U; Windows NT 5.1; en-US; rv:1.9.1.12)
    Gecko/20090201 Firefox/2.0.0.12
 2  Accept: text/xml,application/xml,application/xhtml+xml,text/html;q=0.9,
    text/plain;q=0.8,image/png,*/*;q=0.5
 2  Accept-Language: en-us,en;q=0.5
 2  Accept-Encoding: gzip,deflate
 2  Accept-Charset: ISO-8859-1,utf-8;q=0.7,*;q=0.7
 2  Keep-Alive: 300
 2  Connection: keep-alive
 2  Referer: http://www.webtapsecurity.com/download.html
 2  Content-Type: application/x-www-form-urlencoded
 2  Content-Length: 73
 3  ███Name=John███name=Doe███=johndoe840example.com███=████
```

FIG. 6

```
1 char s[100];
2 scanf("%100s", s);
3 if (strlen(s) > 10)
4     exit();
5 else
6     fprintf(filestream, "%d-%s", strlen(s), s);
```

METHOD, SYSTEM AND COMPUTER PROGRAM PRODUCT FOR DETECTING AT LEAST ONE OF SECURITY THREATS AND UNDESIRABLE COMPUTER FILES

CROSS-REFERENCE TO RELATED APPLICATIONS

This application claims the benefit of U.S. provisional patent application Ser. No. 61/128,200 entitled "Method And System For Identifying At Least One Of Undesirable Network Traffic, Computer Programs And Computer Files" filed May 20, 2008. This application is a continuation-in-part application of patent application Ser. No. 11/255,835 entitled "Method, System And Computer Program Product For Detecting Security Threats In A Computer Network" filed Oct. 21, 2005 now U.S. Pat. No. 8,079,080.

BACKGROUND OF THE INVENTION

1. Field of the Invention

This invention generally relates to methods, systems and computer program products for detecting at least one of security threats and undesirable computer files.

2. Background Art

The following references may be cited herein:

[Ahsan00] K. Ahsan. Covert Channel Analysis and Data Hiding in TCP/IP. Master's Thesis, University of Toronto, 2000.

[Ahsan02] K. Ahsan and D. Kundur. Practical Data Hiding in TCP/IP. *Proceedings of the ACM Workshop on Multimedia Security*, December 2002.

[Axelsson00] S. Axelsson. The Base-rate Fallacy and the Difficulty of Intrusion Detection. *ACM Transactions on Information and System Security*, 3(3):186-205, August 2000.

[Barford98] P. Barford, A. Bestavros, A. Bradley, and M. Crovella. Changes in Web Client Access Patterns: Characteristics and Caching Implications. *BU Computer Science Technical Report*, BUCS-TR-1998-023, 1998.

[Berners96] T. Berners-Lee, R. Fielding, and H. Frystyk. Hypertext Transfer Protocol-HTTP/1.0. Internet Engineering Task Force, May 1996. RFC 1945.

[Borders04] K. Borders and A. Prakash. Web Tap: Detecting Covert Web Traffic. *Proceedings of the 11th ACM Conference on Computer and Communications Security (CCS)*, Washington, D.C., October 2004.

[Borders07] K. Borders, A. Prakash, M. Zielinski. Spector: Automatically Analyzing Shell Code. *Proceedings of the 23rd Annual Computer Security Applications Conference (ACSAC)*, Miami, Fla., December 2007.

[Brand85] Sheila L. Brand. DoD 5200.28-STD Department of Defense Trusted Computer System Evaluation Criteria (Orange Book). National Computer Security Center, December 1985.

[Brumley06] D. Brumley, J. Newsome, D. Song, H. Wang, and S. Jha. Towards Automatic Generation of Vulnerability-based Signatures. *Proceedings of the 2006 IEEE Symposium on Security and Privacy*, pp. 2-16, 2006.

[Brumley07] D. Brumley, J. Caballero, Z. Liang, J. Newsome, and D. Song. Towards Automatic Discovery of Deviations in Binary Implementations with Applications to Error Detection and Fingerprint Generation. *Proceedings of the 16th USENIX Security Symposium*, Boston, Mass., August 2007.

[Caballero07] J. Caballero, H. Yin, Z. Liang, and D. Song. Polyglot: Automatic Extraction of Protocol Message Format Using Dynamic Binary Analysis. *Proceedings of the 14th ACM Conference on Computer and Communications Security (CCS)*, Washington, D.C., October 2007.

[Cabuk04] S. Cabuk, C. Brodley, and C. Shields. IP Covert Timing Channels: Design and Detection. *Proceedings of the 11th ACM Conference on Computer and Communications Security (CCS)*, Washington, D.C., October 2004.

[Cadar06] C. Cadar, V. Ganesh, P. Pawlowski, D. Dill, D. Engler. EXE: Automatically Generating Inputs of Death. In Proc. of the 13$^{th}$ ACM Conference on Computer and Communication Security, 2006.

[Castro06] S. Castro. How to Cook a Covert Channel. hakin9, January 2006.

[Christodorescu05] M. Christodorescu, S. Jha, S. Seshia, D. Song, and R. Bryant. Semantics-aware Malware Detection. *Proceedings of the 2005 IEEE Symposium on Security and Privacy*, May 2005.

[Cid08] D. Cid. OSSEC Open Source Host-based Intrusion Detection System. April 2008.

[Dingledine04] R. Dingledine, N. Mathewson, and P. Syverson. Tor: The Second-generation Onion Router. *Proceedings of the 13th USENIX Security Symposium*, August 2004.

[Duska97] B. Duska, D. Marwood, and M. J. Feeley. The Measured Access Characteristics of World Wide Web Client Proxy Caches. *Proceedings of USENIX Symposium on Internet Technology and Systems*, December 1997.

[Dyatlov03] A. Dyatlov and S. Castro. Exploitation of Data Streams Authorized by a Network Access Control System for Arbitrary Data Transfers: Tunneling and Covert Channels Over the HTTP Protocol. June 2003.

[Dyatlov08] A. Dyatlov and S. Castro. Wsh 'Web Shell'. March 2008.

[Fisk02] G. Fisk, M. Fisk, C. Papadopoulos, and J. Neil. Eliminating Steganography in Internet Traffic with Active Wardens. *Proceedings of the 5th International Workshop on Information Hiding*, October 2002.

[Foster02] J. Foster, T. Terauchi, and A. Aiken. Flow-sensitive Type Qualifiers. *Proceedings of the ACM SIGPLAN Conference on Programming Language Design and Implementation (PLDI)*, Berlin, Germany, June 2002.

[Garfinkel03] T. Garfinkel, B. Pfaff, J, Chow, M. Rosenblum, D. Boneh. Terra: a Virtual Machine-based Platform for Trusted Computing. *Proceedings of the Nineteenth ACM Symposium on Operating Systems Principles (SOSP)*, Bolton Landing, N.Y., October 2003.

[Giles03] J. Giles and B. Hajek. An Information-theoretic and Game-theoretic Study of Timing Channels. *IEEE Transactions on Information Theory*, 48:2455-2477, September 2003.

[Gligor93] V. Gligor. A Guide to Understanding Covert Channel Analysis of Trusted Systems. *National Computer Security Center Technical Report*, NCSC-TG-030, Ft. George G. Meade, M D, November 1993.

[Gray94] J. Gray III. Countermeasures and Tradeoffs for a Class of Covert Timing Channels. *Hong Kong University of Science and Technology Technical Report*, 1994.

[Heinz04] F. Heinz, J. Oster. Nstxd-IP Over DNS Tunneling Daemon. March 2005.

[Kelly02] T. Kelly. Thin-Client Web Access Patterns: Measurements From a Cache-busting Proxy. *Computer Communications*, 25(4):357-366, March 2002.

[Kruegel03] C. Kruegel and G. Vigna. Anomaly Detection of Web-based Attacks. *Proceedings of the 10th ACM Conference on Computer and Communications Security (CCS)*, Washington, D.C., October 2003.

[Microsoft08] Microsoft Corporation. BitLocker Drive Encryption: Technical Overview. April 2008.

[Netwitness08] NetWitness Corporation. NetWitness-Total Network Knowledge. April 2008.

[Newsome05] J. Newsome and D. Song. Dynamic Taint Analysis for Automatic Detection, Analysis, and Signature Generation of Exploits on Commodity Software. *Proceedings of the 12th Annual Network and Distributed System Security Symposium (NDSS)*, San Diego, Calif., February 2005.

[Nguyen-Tuong05] A. Nguyen-Tuong, S. Guarnieri, D. Greene, J. Shirley, and D. Evans. Automatically Hardening Web Applications Using Precise Tainting. *Proceedings of the 20th IFIP International Information Security Conference*, Makuhari Messe, Chiba, Japan, June 2005.

[Niksic98] H. Niksic. GNU Wget.—The Noninteractive Downloading Utility. September 1998.

[NSA08] National Security Agency. Security-enhanced Linux. April 2008.

[Oberheide07] J. Oberheide, E. Cookie, and F. Jahanian. Rethinking Antivirus: Executable Analysis in the Network Cloud. *Proceedings of the 2nd USENIX Workshop on Hot Topics in Security (HOTSEC '07)*, Boston, Mass., August 2007.

[Oscar08] OSCAR Protocol for AOL Instant Messaging. April 2008.

[Paxson98] V. Paxson. Bro: A System for Detecting Network Intruders in Real-time. *Proceedings of the 7th USENIX Security Symposium*, January 1998.

[Paxson00] Y. Zhang and V. Paxson. Detecting Backdoors. *Proceedings of the 9th USENIX Security Symposium*, August 2000.

[Proctor07] P. Proctor, R. Mogull, and E. Quellet. Magic Quadrant for Content Monitoring and Filtering and Data Loss Prevention. *Gartner RAS Core Research Note*, G00147610, April 2007.

[Richardson07] R. Richardson. CSI Computer Crime and Security Survey. 2007.

[Roesch99] M. Roesch. Snort—Lightweight Intrusion Detection for Networks. *Proceedings of the 13th USENIX Systems Administration Conference (LISA)*, Seattle, Wash., 1999.

[Roshal08] A. Roshal. WinRAR Archiver, a Powerful Tool to Process RAR and ZIP Files. April 2008.

[RSA07] RSA Security Inc. RSA Data Loss Prevention Suite—Solutions Brief. 2007.

[Sailer04] R. Sailer, X. Zhang, T. Jaeger, and L. Doorn. Design and Implementation of a TCG-based Integrity Measurement Architecture. In Thirteenth Usenix Security Symposium, pp. 223-238, 2004.

[Sandvine08] Sandvine, Inc. Sandvine—Intelligent Broadband Network Management. April 2008.

[Servetto01] S. Servetto and M. Vetterli. Communication Using Phantoms: Covert Channels in the Internet. *Proceedings of the IEEE International Symposium on Information Theory*, June 2001.

[Vigna04] G. Vigna, W. Robertson, and D. Balzarotti. Testing Network-Based Intrusion Detection Signatures Using Mutant Exploits. *Proceedings of the 11th ACM Conference on Computer and Communications Security (CCS)*, Washington, D.C., October 2004.

[Vontu08] Vontu, Inc. Vontu—Data Loss Prevention, Confidential Data Protection. April 2008.

[Winzip08] WinZip International LLC. WinZip—The Zip File Utility for Windows. April 2008.

[Wray91] J. Wray. An Analysis of Covert Timing Channels. *Proceedings of the 1991 IEEE Symposium on Security and Privacy*, Oakland, Calif., May 1991.

[Zimmerman95] P. R. Zimmermann. The Official PGP User's Guide. *MIT Press*, 1995.

As the size and diversity of the Internet grows, so do the applications that use the network. Originally, network applications such as web browsers, terminal clients, and e-mail readers were the only programs accessing the Internet. Now, almost every application has a networking component, whether it is to obtain updates, manage licensing, or report usage statistics.

Although pervasive network connectivity provides a number of benefits, it also introduces security risks. Many programs that access the network allow users to leak confidential information or expose them to new attack vectors. An example is instant messaging (IM) software. Most IM programs permit direct file transfers. Also, so-called IM viruses are able to circumvent security systems by going through the IM network itself. Peer-to-peer file sharing software presents a risk as well because files often come packaged with Trojan horse malware. These unwanted applications are not outright malicious and therefore not detected by conventional security software, but they can still pose a serious threat to system security.

In addition to unwanted applications, many programs that directly harm their host computers communicate over the network. The resulting malware traffic may contain sensitive information, such as log-in names, passwords, and credit card numbers, which were collected from the host. This traffic may also have command and control information, such as instructions to download other malicious programs or attack other computers.

Identifying web applications that are running on a computer and differentiating them from one another is essential to improving overall network security and visibility. Furthermore, doing so with a network monitoring system introduces minimal overhead and ensures that the security system itself is isolated from attack.

As the Internet grows and network bandwidth continues to increase, administrators are faced with the task of keeping confidential information from leaving their networks. Today's link speeds and traffic volume are such that manual inspection of all network traffic would be unreasonably expensive. Some security solutions, such as intrusion prevention systems and anti-virus software, focus on protecting the integrity of computers that house sensitive information. Unfortunately, these approaches do not stop insider leaks, which are a serious security threat. In the latest 2007 CSI/FBI survey of computer crimes, insider abuse ranked above virus outbreaks as the most prevalent security threat with 59% of respondents having experienced insider abuse [Richardson07].

In response to the threat of insider leaks, some vendors have provided data loss prevention (DLP) systems that inspect outgoing traffic for known confidential information [Vontu07, RSA08]. Although these systems may stop naïve adversaries from leaking data, they are fundamentally unable to detect the flow of encrypted or obfuscated information. What remains is an almost completely wide-open pipe for leaking encrypted confidential information to the Internet.

Traditional threat detection approaches involve directly categorizing and identifying malicious activity. Examples of this methodology include anti-virus (AV) software, intrusion detection systems (IDSs), and data loss prevention (DLP) systems. These systems rely on blacklists that specify undesirable programs and network traffic. Blacklists have a number of benefits. First, when some malicious activity matches a signature on a blacklist, an administrator immediately knows the nature of the threat and can take action. Second, many blacklists (those for IDSs and AV software) are globally applicable and require little tuning for their target environment (e.g., a known computer virus is unwanted in any network). Widespread applicability also goes hand in hand with low false-positive rates; activity that matches a blacklist is usually not of a legitimate nature. These advantages, along with the simplicity and speed of signature matching, have made blacklisting the most prevalent method for threat detection.

Despite its benefits, blacklisting suffers from fundamental limitations that prevent it from operating effectively in today's threat environment. One limitation is that a blacklist must include profiles for all unwanted activity. Malicious software (malware) is now so diverse that maintaining profiles of all malware is an insurmountable task. Research shows that even the best AV software can only detect 87% of the latest threats [Oberheide07]. Furthermore, a hacker who targets a particular network can modify his or her attack pattern, test it against the latest IDS and AV signatures, and completely avoid detection, as is demonstrated in. [Vigna04].

The following U.S. patent documents are related to the present invention: U.S. Pat. Nos. 6,519,703; 6,671,811; 6,681,331; 6,772,345; 6,708,212; 6,801,940; and U.S. Publication Nos. 2002/0133586; 2002/0035628; 2003/0212903; 2003/0004688; 2003/0051026; 2003/0159070; 2004/0034794; 2003/0236652; 2004/0221191; 2004/0114519; 2004/0250124; 2004/0250134; 2004/0054925; 2005/0033989; 2005/0044406; 2005/0021740; 2005/0108393; 2005/0076236; and 2007/0261112.

SUMMARY OF THE INVENTION

An object of at least one embodiment of the present invention is to provide an improved method, system and computer program product for detecting at least one of security threats and undesirable computer files.

In carrying out the above object and other objects of the present invention, a method of detecting security threats in a computer network is provided. The method includes receiving a data stream which represents outbound, application layer messages from a first computer process to at least one second computer process wherein the computer processes are implemented on one or more computers. The method further includes monitoring the data stream to detect a security threat based on a whitelist having entries which contains metadata, the whitelist describing legitimate application layer messages based on a set of heuristics. The method still further includes generating a signal if a security threat is detected.

The method may further include generating and adding new metadata to the whitelist.

The metadata may contain alert filters that specify sets of alerts to match.

The messages may include HTTP messages.

Substantially all of the computer processes may be implemented inside the network.

At least one of the second computer processes may be implemented outside of the network.

The whitelist entries may associate the alerts with particular applications. All of the entries for a particular application may include an application profile for the particular application. Each application profile may include one or more alert filters.

One of the alerts may be a formatting alert.
The formatting alert may be an unknown user agent alert.
The formatting alert may be an unknown header field alert.
The formatting alert may be a bad header format alert.
One of the alerts may be a timing alert.
The timing alert may be a delay time alert.
The timing alert may be a regularity alert.
The timing alert may be a time of day alert.
One of the alerts may be a bandwidth alert.

Each whitelist entry may include a matching section which specifies which alert the entry matches and an action which associates alerts that match the entry with a particular application.

The whitelist may include a mapping from the metadata to legitimate applications.

Further in carrying out the above object and others of the present invention, a method of detecting undesirable computer files is provided. The method includes comparing a set of computer files with a whitelist which characterizes all legitimate computer files. The whitelist contains one or more entries. Each of the entries describes a plurality of legitimate computer files.

The method may further include generating a signal if one or more of the set of computer files are not on the whitelist.

Each of the entries of the whitelist may contain metadata that matches a set of files using a formatting filter.

The whitelist may contain application profiles that contain the one or more entries.

Each of the entries may describe a plurality of legitimate computer files that can be read, written or executed by an application or operating system.

Each of the computer files may be a data file.

Still further in carrying out the above object and other objects of the present invention, a system for detecting security threats in a computer network is provided. The system includes means for receiving a data stream which represents outbound, application layer messages from a first computer process to at least one second computer process. The computer processes are implemented on one or more computers. The system further includes means for monitoring the data stream to detect a security threat based on a whitelist having entries which contains metadata, the whitelist describing legitimate application layer messages based on a set of heuristics. The system still further includes means for generating a signal if a security threat is detected.

The system may further include means for generating and adding new metadata to the whitelist.

The metadata may contain alert filters that specify sets of alerts to match.

The messages may include HTTP messages.

Substantially all of the computer processes may be implemented inside the network.

At least one of the second computer processes may be implemented outside of the network.

The whitelist entries may associate the alerts with particular applications. All of the entries for a particular application may include an application profile for the particular application. Each application profile may include one or more alert filters.

One of the alerts may be a formatting alert.
The formatting alert may be an unknown user agent alert.
The formatting alert may be an unknown header field alert.
The formatting alert may be a bad header format alert.
One of the alerts may be a timing alert.
The timing alert may be a delay time alert.
The timing alert may be a regularity alert.
The timing alert may be a time of day alert.
One of the alerts may be a bandwidth alert.

Each whitelist entry may include a matching section which specifies which alert the entry matches and an action which associates alerts that match the entry with a particular application.

The whitelist may include a mapping from the metadata to legitimate applications.

Further in carrying out the above object and other objects of the present invention, a system for detecting undesirable computer files is provided. The system includes a processor operable to execute computer program instructions. The system further includes a memory operable to store computer program instructions accessible by the processor. The system still further includes computer program instructions stored in the memory to perform the step of comparing a set of computer files with a whitelist which characterizes all legitimate computer files. The whitelist contains one or more entries, each of the entries describing a plurality of legitimate computer files.

The system may further include means for generating a signal if one or more of the set of computer files are not on the whitelist.

Each of the entries of the whitelist may contain metadata that matches a set of files using a formatting filter.

The whitelist may contain application profiles that contain the one or more entries.

Each of the entries may describe a plurality of legitimate computer files that can be read, written or executed by an application or operating system.

Each of the computer files may be a data file.

Still further in carrying out the above object and other objects of the present invention, a computer program product for detecting security threats in a computer network is provided. The product includes a computer readable medium. The product further includes computer program instructions recorded on the medium and executable by a processor for performing the step of receiving a data stream which represents outbound, application layer messages from a first computer process to at least one second computer process. The computer processes are implemented on one or more computers. The product still further includes instructions for performing the step of monitoring the data stream to detect a security threat based on a whitelist having entries which contains metadata, the whitelist describing legitimate application layer messages based on a set of heuristics. The product further includes instructions for performing the step of generating a signal if a security threat is detected.

Further in carrying out the above object and other objects of the present invention, a computer program product for detecting undesirable computer files is provided. The product includes a computer readable medium. The product further includes computer program instructions recorded on the medium and executable by a processor for performing the step of comparing a set of computer files with a whitelist which characterizes all legitimate computer files. The whitelist contains one or more entries. Each of the entries describes a plurality of legitimate computer files.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 are equations for derivative of delay and running average;

FIG. 4 is a table of hour of day and day of week;

FIG. 5 is a sample HTTP request for the search term "security" at www.google.com;

FIG. 6 illustrates a sample HTTP POST request for submitting contact information in order to download a file; line 1 is the HTTP request line; lines marked with 2 are requested headers, and the line marked with 3 is the request body; bytes counted by a coarse-grained algorithm are highlighted in gray; actual UI-layer data, which the coarse-grained algorithm also counts, is highlighted in black and white text;

DETAILED DESCRIPTION OF THE PREFERRED EMBODIMENT(S)

Figure 9:
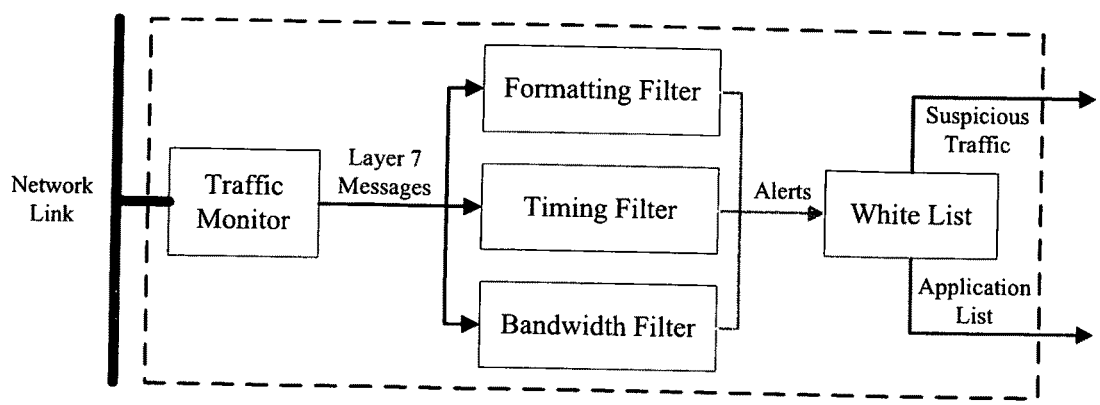
FIG. 9 is a block diagram schematic view of a network monitoring and alerting system constructed in accordance with at least one embodiment of the present invention.
Figure 10:
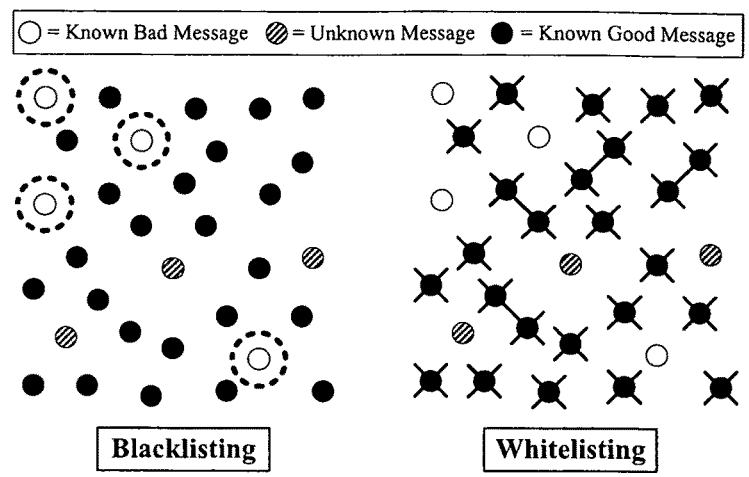
FIG. 10 is an illustration which compares and contrasts the concept of whitelisting with the concept of blacklisting.

Embodiments of a method, system and computer program product of the present invention detect web applications by only looking at their network traffic as described herein with reference to FIGS. 9 and 10. These methods differentiate programmatic web service access from human web browsing and expose information about active web applications. The methods focus on two key aspects of web traffic: timing and formatting. Human web requests occur in randomly interspersed bursts. Programmatic web requests, on the other hand, will often happen at regular fixed intervals. Humans also tend to browse the web at specific times according to a schedule, while programs may access the web at any hour of the day or night. We take advantage of this knowledge to discover web applications that call home on a regular basis.

Another web traffic characteristic that is examined herein is formatting. The HTTP protocol specification contains a "User-Agent" field that applications may use to identify themselves. Although most malicious programs do not identify themselves as such, they will often select a user-agent value that does not match any legitimate programs or omit the field entirely. HTTP also allows for application-specific extension header fields that may hold arbitrary information. The presence of a new or different header field in a request indicates that it came from a non-browser web application. Again, some malware tries to mimic a web browser in its traffic formatting. However, malware writers are prone to human error and may accidentally include an anomalous header field. An example is a spyware program that mistakenly spelled an HTTP header field "referrer" (the correct dictionary spelling), while the specification states that it should be spelled "referer," an incorrect spelling. Our analysis allows us to quickly detect web applications with unique message formatting, which includes a significant portion of malicious software.

The accuracy of the timing analysis is evaluated by testing it on web traffic collected from 30 users over a 40-day period and measuring the false positive rate. We were able to effectively detect programmatic web access while generating very few false positives. We evaluated the formatting filter by separating traffic from different web applications during the same time-period. We found that certain applications generated many different header field and user agent values that were very similar. A lot of user-agents also include a number of independent strings identifying not only the application, but also the operating system version and plug-ins that are present. After separating user-agent fields, we created both literal strings and regular expressions to match all of the different message formats.

We have chosen to focus on HTTP traffic. The reasons for this are twofold. First, HTTP is the most widely-allowed network protocol, and is often the only way to communicate data out to the Internet through firewalls and proxy servers. Second, the HTTP protocol probably has more implementations by more different applications than any other protocol. Protocols such as secure shell and FTP are usually only implemented by network applications, not by other programs that only use the Internet for registration, licensing, and updates.

Related Work

Network monitoring systems exist that can differentiate between traffic of different protocols regardless of the transport-layer port [Netwitness08, Sandvine08]. These systems can even identify protocol tunneling. (Tunneling is when one application-layer protocol is embedded within the payload of another, e.g., HTTPS is HTTP tunneled over SSL.) We go a step further by identifying different applications that implement the same protocol. This is a more difficult problem because the differences between implementations of the same protocol are much more subtle.

In [Brumley07], the authors present a system for automatically discovering deviations between implementations of the same network protocol. Their approach involves binary analysis of the programs in question. In contrast, the algorithms presented herein can differentiate between different applications that use the same protocol (HTTP) without any prior knowledge of the applications or access to the computers on which they are executing. Furthermore, the system in [Brumley07] can only generate network inputs that expose implementation differences, typically in network servers. While the web applications considered herein may take network inputs, our algorithms instead passively examine the network outputs to differentiate client web applications from one another.

Zhang and Paxson describe a method for detecting backdoors [Zhang00]. They look at the timing of packet arrivals and packet sizes in order to characterize an interactive shell. For delay times, they exploited the observation that keystroke inter-arrival periods follow a Pareto distribution with a high variance [Paxson98]. For packet sizes, they excluded connections that did not contain a large enough percentage of small requests. The Pareto model does not extend to spyware and unwanted web applications that we hope to identify herein because they communicate automatically. The Pareto model only works for traffic that corresponds to human key-presses. Instead, delay times from web applications will follow a distribution according to the callback algorithm chosen by the programmer. Focusing on connections with small packet sizes does not help identify web applications either; they can and do send messages with arbitrary sizes.

Significant research exists on characterizing human browsing patterns to enhance proxy cache and web server performance [Barford98, Duska97, Kelly02]. Some of the same traffic characteristics are disclosed herein. However, the purpose of the analysis described herein is identifying non-human web traffic, not improving server performance.

Kruegel et al. outline a method for detecting malicious web requests at the web server [Kruegel03]. They build a probabilistic profile of web request parameters and detect deviations from this profile. The methods presented herein are different because they aim to identify different web applications by looking at client-side traffic. Due to the diversity of websites on the Internet, it would not be feasible to build a profile for normal web browsing to servers in this manner.

Timing Analysis

In this section, two methods for differentiating between network messages resulting from human input are explored, and those generated by automated processes. We created these algorithms based on observations from real web traffic for 30 users over a one-week period. Both of these methods consider groups of HTTP messages between each client and each server as separate. The messages between a particular client and server need not all have come from an automated process; the following algorithms are designed to identify HTTP traffic from which any of the requests are automatic. Furthermore, if an application communicates with multiple web servers, then these techniques will identify each server that receives automated requests.

Regularity

Human web browsing tends to occur in short bursts. Automated web requests, on the other hand, happen at more regular intervals. We measure request regularity by looking at the amount of outbound bandwidth during 5-minute intervals over the past 8 hours and 48 hours. The goal of measuring regularity is to expose automated web requests, even if they occur at random intervals and are interlaced with human activity.

Figure 1:
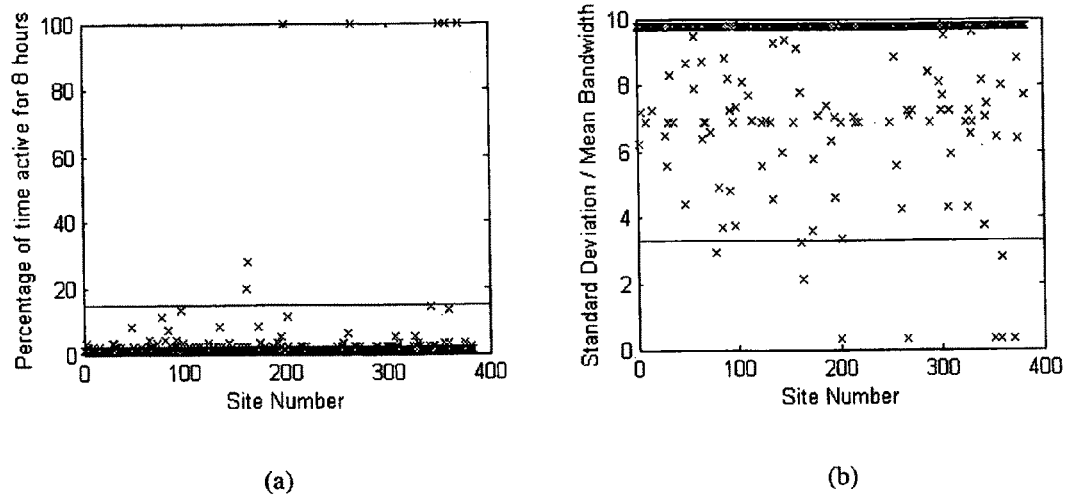
FIG. 1(a) is a graph of site number versus percentage of time active for 8 hours.
FIG. 1(b) is a graph of standard deviation/mean bandwidth versus site number.

Here, we present two methods for computing regularity. The first is to count the number of five-minute time periods during which at least one request was seen for a particular site. If requests appear too often, then they are probably coming from an automated process. FIG. 1(a) shows a plot of bandwidth counts over an 8-hour time period for approximately 400 sites accessed by a single user. Using a threshold of 16% activity (80+minutes), we were able to identify seven sites receiving automated web requests with no false positives. Five of these were in blatant violation of the threshold; they were active during every 5-minute interval in the 8-hour time period. The two other websites served periodically-refreshing advertisements. There were also five servers close to the detection threshold (between 10% and 16%), only two of which were false positives, both from social networking sites. The 16% threshold was chosen conservatively to avoid false alarms and could be lowered even further depending on the target network.

The second method for computing regularity involves calculating the coefficient of variation (c.o.v.) for 5-minute bandwidth measurements over the previous 8 or 48 hours. The coefficient of variation is the standard deviation divided by the mean bandwidth usage. Conceptually, this number represents a normalized deviation. If requests occur in short bursts, which is characteristic of normal human activity, then the coefficient of variation will be high. Low variation in bandwidth usage is indicative of automated activity. The plot of the coefficient of variation measurements for an 8-hour time period can been seen in FIG. 1(b). We found thresholds of 3.3 for 8 hours and 4.5 for 48 hours to be effective. At those settings, the coefficient of variation method detected nine sites in violation of the threshold both over an 8-hour and a 48-hour period, none of which were false positives. Much like the sites close to the threshold for the counting method, three of the five sites just above 3.3 were false positives, all associated with social networking sites. For a network with less frequent browsing, the threshold for this filter could be effectively raised to around 4.0 for an 8-hour period without producing many false positives. All of the seven sites filtered by the counting method were also filtered by the coefficient of variation method.

The reason for employing two different algorithms to measure regularity is that they each have advantages in different circumstances. The c.o.v. measurement is generally more effective for differentiating between human and automated requests. However, a malicious web application could remain active during every 5-minute time interval over an 8-hour period without exceeding the c.o.v. threshold by varying the amount of bandwidth in each interval. This type of attack would fail of both the count and c.o.v. algorithms are deployed.

Inter-Request Delay

Figure 2:
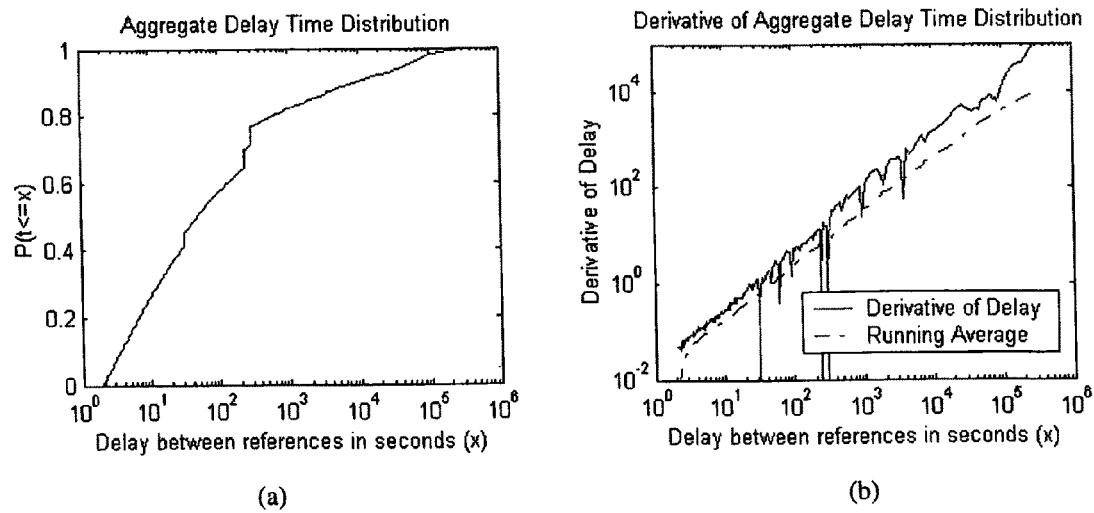
FIG. 2(a) is a graph which illustrates aggregate delay time distribution.
FIG. 2(b) is a graph which illustrates derivative of aggregate delay time distribution including derivative of delay and running average.

Some web applications generate requests using a fixed-interval timer. The goal of our delay-time measurements is to identify timer-driven requests. We measured the inter-request delay time for requests to each server from each client. We stored these delay measurements in individual vectors for each client/server pair and in an aggregate vector for all clients and servers to observe the general inter-request delay distribution. FIG. 2(a) shows the probabilistic distribution of all delay times. One notices jumps in the cumulative distribution function (CDF) at 30 seconds, 4 minutes, and 5 minutes. There are also lesser-pronounced jumps at 15 minutes, 30 minutes, and one hour. These jumps correspond to requests that are driven by fixed-interval timers.

The jumps can be observed more clearly if one takes the derivative with respect to the y-axis of the cumulative distribution function. This can be seen in FIG. 2(b). The derivative is plotted along with its running average multiplied by 0.8. The average helps to illustrate places where the derivative drops below the amount of a typical fluctuation. The dips in the derivative that drop below the dotted line correspond to jumps in the distribution at times 30 seconds, 60 seconds, 90 seconds, 4 minutes, 5 minutes, 15 minutes, 30 minutes, 60 minutes respectively. Equations for the derivative and the average can be found in FIG. 3. V is a vector of delay times taken from every nth element in the full delay vector for a site. We chose the maximum of the square root of the full vector size or five for n. The value a represents the number of values used in the running average. We picked the maximum of the square root of the size of V or 3 for a.

Time of Day

The time of day during which a computer generates HTTP requests can help determine whether or not those requests are the result of human activity or come from an automated program. The optimal way to identify automated requests is to have an out-of-band input that tells us whether or not the user is actively using the computer. This could be achieved using a hardware device that passively monitors disk and keyboard activity, or by installing a monitoring program on each computer. However, direct information about whether the user is active may not always be available, especially with a passive network monitoring system.

For cases where direct information about user activity is unavailable, we can analyze human usage patterns during a training period and build activity profiles. We found that people tend to follow fixed schedules and during the same time periods each day. FIG. 4 illustrates regular web browsing by one home user during the first six days of observation. The activity times stay fairly consistent from day to day. After a profile has been built for each user during an initial training period, we can mark HTTP requests made outside of typical usage times as likely having come from an automated web application rather than human browsing.

As described herein, we looked at request timing for home users, many of whom were college students with irregular schedules. Still, we observed strikingly consistent browsing patterns. We expect the time-of-day approach to be even more effective in a work environment where employees have very regular schedules. Furthermore, the analysis could be extended to create special schedules for weekends and holidays when human browsing is much less likely in a work environment and more likely at home.

Eliminating False Positives from Refreshing Web Pages

Without any special processing, false positives will occur for web pages that periodically refresh. If a user leaves a refreshing web page open, its requests will trigger the time-of-day, inter-request delay, and request regularity filters. These types of refreshing pages are prevalent on the Internet and must be eliminated for consideration by the algorithms presented earlier herein.

The way that we discount refreshing pages is by explicitly searching for refresh constructs within each web page. Refresh constructs include the HTML "<meta http-equiv="refresh" . . . >" tag as well as the Javascript "setInterval" and "setTimeout" functions. If a document contains a refresh construct, it is marked as refreshing. Requests for refreshing documents are treated as if they occurred at the time of the original document request. So, if a user loads a refreshing website before going home and leaves it open until the next day, then the time-of-day, regularity, and delay-time filters will not generate false positives.

Additionally, we should ignore request times for resources that a client retrieves as a result reloading a refreshing page. If we only ignore request times for the refreshing page itself, then we will still see false positives for its embedded images and other objects. The best way of doing this is to examine the "referer" HTTP request header and determine the page that linked to the current object. If the referring page was loaded recently, then we can use its effective request time, which will be the first load time for a refreshing page. This way, we can avoid false positives from image and object loads associated with refreshing pages.

Formatting Analysis

The HTTP protocol specification allows for a wide range of message types and header fields. However, the set of possible HTTP requests that a web browser may send at any given time is much more limited. The goal of our formatting analysis is to determine the set of HTTP requests R that a web browser may send and mark any other requests r∉R as coming from a non-browser web application. These flagged requests are subsequently fed through a whitelist to determine their source web application. The whitelisting process is discussed in greater detail herein.

There are two general strategies for enumerating the set R of HTTP requests that a browser may send: stateful analysis and stateless analysis. The result of stateless analysis is a language of all possible network outputs that a browser would ever generate, regardless of its inputs. Stateless analysis is simple and yields a large domain of potential HTTP requests. Stateful analysis, on the other hand, takes previous program inputs into account when determining the set of possible HTTP requests. A network monitoring system only has network inputs available to it, but stateful analysis running on the same computer as the web browser could also consider inputs such as mouse clicks, key presses, and clipboard paste operations. Although it is more costly, stateful analysis can produce a much smaller and more precise set of possible HTTP requests.

HTTP requests consist of three sections: the request line, the request headers, and the request body. A sample HTTP request for the search term "security" at www.google.com can be seen in FIG. 5. The first line of the HTTP request is the request line. The first word on this line is the request method, which is usually either "GET" for obtaining a resource or "POST" for submitting data in almost all cases. Next is the path of the requested resource, which forms the request URL when combined with the hostname. The last part of the request line is the HTTP version, which is either 1.0 or 1.1 for any modern web client. Because the request method and HTTP version have so few possible values, they are rarely helpful in identifying web applications. In a stateless formatting analysis, the path can take on any value that is a valid URL string for a legitimate browser, so it also cannot help us identify web applications.

With an in-depth stateful session analysis, we can severely restrict the set of valid HTTP request URLs and POST body contents. The HTTP protocol is used by web browsers to retrieve resources from an external network, most often the Internet. Each resource has its own uniform resource locator (URL) that uniquely identifies the resource. For a web browser to fetch a network resource, it needs to receive the resource's URL as input. In general, inputs usually come from one of three locations:

1. Human Input—A user may type a URL into the address bar or add it as a favorite.
2. The Clipboard—A user may copy and paste a URL from another application, such as an e-mail reader or instant messaging program.
3. Another Network Resource—A majority of URLs come from resources downloaded by the web browser, such as web pages and scripts. Every link or button selected by the user falls under this category, as well as active Javascript and XML (AJAX) requests that occur in the background.

Network monitoring systems can only access URL inputs that come from other network resources. However, the first HTTP request that a browser makes in an initial state must come from one of the first two sources, as it does not yet have other network resources available. So, the initial set R of possible HTTP requests should only contain requests that can occur as a result of unobservable input (human input, the clipboard, or any other non-network input). If human or clipboard input is also available, as may be the case with a host-based monitoring system or keyboard/mouse monitoring device, then we can further refine the set R so that it only includes requests for URLs entered or copied by the user. For network monitoring systems that do not have this information, we will refer to any HTTP request with a URL from an unobservable input as an initial request. Initial requests should be treated with a high level of scrutiny, as they are almost always entered by the user and should usually contain short, simple URLS, such as the main page of a search engine. If they contain complex data, then it is much more likely that they came from a non-browser web application and they should be flagged as suspicious. Requests for exact URLs that the user has retrieved before should not be flagged because the user may have saved the URL as a favorite link. In general, we can flag the following types of initial requests:

Requests that use any method other than GET (POST, PUT, etc.). Web browsers will always use GET for initial requests.

Requests that appear to have form parameters in the URL (e.g. http://www.site.com/submit?name=john&age=35). These are indicative of a form submission.

Requests with paths that are longer than a certain length or that contain one or more slashes (e.g. http://www.site.com/reallyreallylongpath or http://www.site.com/path-with/slash). These types of requests are more likely to have come from another web application rather than human input into a web browser.

Now that we have enumerated the set of initial requests, we must keep track of all the network resources fetched by the browser and continually update the set R of possible HTTP requests given the browsing session state. When the user fetches a new web resource r, we can add all of the URLs to which the resource r contains links to the set of possible HTTP requests R. Possible requests may be removed from R after a certain time-interval, such as an hour, after which their parent resources (resource that contain links to them) have most likely been closed by the user. If a host-based monitoring system is employed or information about closing of resources is available from some other source, then the requests for URLs may be removed from R as soon as it is known that their parent resources have been closed by the user. Furthermore, if information about human input is available, a request for a specific URL may not be added to the set R until the user selects a link, button, or other UI element that links to that URL.

Link enumeration given the set of previous resources that have actually been loaded by the user, L, is straightforward for simple HTML documents, but can be difficult in the presence of scripts or embedded programs. HTML documents contain a number of elements, such as forms, anchors, style sheets, images, etc. that specify URLs to which the user may send requests to submit data or obtain other resources. Constructing the URLs of links given HTML elements is simply a matter of extracting strings from the document, and possibly concatenating them to the name of the current web host. Embedded scripts and programs may also create or modify link URLs. The way that these objects affect links may be determined by straightforward program analysis in many cases (e.g., extracting the URL string from an "onclick='document.location.url=/other_url'" construct). However, determining the exact URLs to which an object may link could require sophisticated dynamic analysis, static analysis, or executing the object in its natural environment (e.g. rendering a Java applet in a Java virtual machine) with simulated or real human input. Theoretically, deciding the set of all URLs to which any executable object may link is undecidable due to the halting problem. However, this is almost never a limitation in practice. Finally, once the set R has been updated with requests for URLs that are possible given the set of loaded pages L, which is an empty set at the beginning of a session, we can flag any requests not in R as most likely coming from a non-browser web application.

We focus on the header fields following the request line to uncover information about the client that made the request. The HTTP specification describes the use of standard header fields, but allows for custom extension header fields [Bemers96]. An extension header field can be any alphabetic string (optionally including the characters '-' and '_'). The presence of particular extension header fields will often uniquely identify a web application. We flag any HTTP request that contains header fields not present in requests made by standard web browsers.

The HTTP specification includes an optional standard header field known as the "User-Agent." The purpose of the User-Agent field is for clients to explicitly identify themselves. Legitimate web applications will usually include a unique string in the User-Agent field. Only a few programs, such as news readers, will omit the field entirely. Standard web browsers use special compound User-Agent values that may include information about the client operating system, browser plug-ins, client language, etc. An example of a compound User-Agent value can be seen in FIG. 5. Because each part of a compound User-Agent may be associated with a different client application component, we split User-Agent values in this format and flag requests with elements that are not present in standard browser requests. This not only helps in identifying legitimate web applications, but also exposes certain adware and spyware programs that masquerade as useful browser plug-ins.

TABLE 1

| Filter Name | | # Alerts | Avg. Alerts/Day | False Positives (Percentage) |
|---|---|---|---|---|
| Message Format | | 240 | 6.00 | 0 (0%) |
| Delay Time | | 118 | 2.95 | 6 (5%) |
| Request | 8-Hour | 132 | 3.30 | 15 (11%) |
| Regularity | 48-Hour | 65 | 1.63 | 5 (8%) |
| Time of Day | | 68 | 2.62 | 19 (28%) |
| Aggregate | | 623 | 16.5 | 45 (7%) (avg. 1.13 alerts/day) |

Traffic Evaluation

After a one-week learning period, during which we designed the filters and set their thresholds, we put the filters to the test against 40 days of web traffic from 30 users. The 40 days of web traffic included 428,608 requests to 6441 different websites totaling 300 Megabytes in size. During the evaluation, all the filters were active for every site and user. The purpose was to measure how effective the filters were at differentiating automated web activity from human browsing, including the false positive rate. We did not apply any whitelist rules to the resulting alerts to classify their source web application. To determine false positives, we only checked to see whether each alert was, in fact, the result of non-browser web application activity.

Table 1 summarizes the results of the evaluation. A total of 623 alerts were generated over the 40-day evaluation period for 30 users, an average of 0.55 alerts per user per day. These alerts led to the identification of seventeen different non-browser web applications and one non-standard browser. Six of these were unwanted spyware programs. We found that at least 5 out of the 30 observed users had some form of adware or spyware on their computers. In addition to the spyware programs, others were detected that may not be desirable in a work environment. These included Kazaa, iTunes, AIM Express, and BitTorrent. Benign web applications that we were able to identify include Windows Update, McAfee Web Update, and others.

During the evaluation, there were only 45 false positives total, an average of 1.13 per day for all 30 users. In a network with 1000 computers, this extrapolates to about 38 false positives per day. Keep in mind, however, that this traffic is from home computers with diverse usage patterns. Some of the false positives that arose, such as those from continually browsing a social networking site for two hours, should be less likely in an enterprise environment. Furthermore, we could eliminate false positives from the time-of-day filter, which generated the most false positives, by incorporating out-of-band information about peoples' schedules or by getting rid of the filter altogether. Not counting the time-of-day filter, there was an average of 0.65 false positives per day. Considering these factors, we believe the number of false positives to be reasonable for enterprise deployment.

Regularity

The regularity filter results seen in Table 1 consisted of both count and coefficient of variation measurements. We considered the number of false positives generated by this filter to be acceptable (approximately one false alarm every three days). The servers that caused false alarms hosted popular websites such as ebay.com and livejournal.com. Many of the sites flagged by the regularity filter were found by the delay time filter as well. The regularity filter did, however, find an additional type of spyware that the delay filter was unable to detect: browser search bars. This particular breed of unwanted program imbeds itself into the person's browser and calls back to its host every time the browser opens up, as well as throughout the browsing session. These are different from other malware programs because their callbacks are triggered by human activity and thus cannot easily be differentiated from a person based on inter-request delay times. We successfully detected sites that used frequent requests with this filter, even if they coincided with human usage.

Inter-Request Delay

For the delay time measurements, we logged website access times using one-second granularity. The reason we did not use more precision is that none of the timers observed had periods of less than 30 seconds. In order to detect shorter-period timers, additional precision would be required to differentiate a timer from repeated short delay times. The false positive rate for the delay time filter was low (an average of one false alarm every 6 days for our test group). These false positives came from websites whose refresh mechanisms we were not able to detect with our false positive reduction algorithm.

Time of Day

The time of day filter was initially configured using the one-week training period. After seeing preliminary results, we lengthened the training time to also include the first week of the 40-day period so it was two weeks total. This increased the effectiveness of the filter, as it may take a few weeks to accurately capture browsing patterns. It is important to note that some automated web applications were active during the training period. We did not attempt to remove non-human activity from the training data. The effectiveness of training could be improved to generate more true positives by removing traffic for sites that are identified by the other filters as receiving traffic from automated web applications. Nevertheless, we were able to detect programs such as Gator and Wildtangent even though they had been active during the training period. This may have been caused by post-training installation, or by changes to the schedule of when a computer is on, but not actively used.

Formatting

The large number of formatting alerts can be attributed to the fact that the formatting filter raises an alarm when it sees a bad header once for each web server per user. This means that if iTunes were to access 10 different sites, each would generate an alarm. The whitelisting techniques we present herein help aggregate these duplicate alerts for known web applications.

HTTP Tunnel Evaluation

We tested the effectiveness of the timing and formatting filters against a number of HTTP tunnel and backdoor programs. These programs are designed to blend automated activity in with legitimate web traffic in order to bypass firewalls and avoid detection. The tunneling programs that we tested include Wsh [Dyatlov04a], Hopster [Hopster08], and Firepass [Dyatlov04b]. We also tested a backdoor program that we designed, Tunl which allows a hacker outside the network to remotely control a machine behind a firewall using a command-shell interface and HTTP request callbacks.

Third Party HTTP Tunnels

We installed the three tunneling programs on a computer and sent out information using each. The format filter was immediately able to detect both Wsh and Firepass because they used custom header fields in their requests. Following its initial connection, we were unable to successfully transfer any data using Firepass. Wsh did work properly, but did not trigger any timing alerts because it generated requests in response to human input.

We used Hopster to tunnel traffic from AOL Instant Messenger in our experiments. It began running at 10:30 PM and no messages were sent during the night. The next day, 10 KB of data was sent out around Noon. Hopster was not detected immediately like Firepass and Wsh because it copied web browser request formatting. Unlike the other two programs, Hopster did make frequent callbacks to its server that triggered the regularity filter after 80 minutes and the delay time filter after two hours.

Tunl Design

To further evaluate our system, we also designed a prototype remote shell backdoor called Tunl. It is made to simulate the scenario where a hacker is controlling a compromised computer that is behind a firewall with a remote command shell interface. Tunl consists of two executables, a client, TunlCli, that runs on the compromised host and server, TunlServ, that runs on run on a machine controlled by the attacker. Tunl can tunnel its traffic through an HTTP proxy server or send its HTTP requests directly to the Internet, blending in with normal web traffic.

The first thing TunlCli does when it starts up is launch a hidden command shell with redefined standard input, output, and error handles. It then redirects the input and output from the command shell to a remote console running on TunlServ using HTTP requests. In addition to forwarding data from the command shell output, it makes periodic callbacks to check for server commands. Custom get and put commands, which are not piped to the shell, are included in Tunl for easy file transfers. To avoid sending too many small requests, data is buffered and sent out every 100 milliseconds.

Although the attacker has an illusion of a command shell on the Tunl server, requests may take a long time to execute because they are fetched by periodic TunlCli callbacks. The server has no way of directly connecting to the client. It has to wait for a ping in the form of an HTTP request, and then return commands in the body of an HTTP reply. Callbacks were scheduled at one-hour intervals with two optional retries at 30-second intervals following each callback for failed connection attempts. Only calling back every hour ensures that Tunl generates a low volume of HTTP requests and blends in with normal traffic. All of the messages exchanged between the client and server match the format of an Internet Explorer web browser and a standard-configuration Apache web server, respectively. This avoids detection by formatting filters.

Tunl with Callback-Only Workload

To evaluate the performance of timing filters herein, we installed the Tunl program and monitored its traffic. The first workload we tested consisted only of callbacks to the Tunl server (the Tunl client and server are connected, but the server did not issue commands). This represents the time when a machine has compromised but is not actively executing commands. The results for the Tunl client only making callbacks were promising. Even though the client executed no commands, the traffic from this trace was caught by the request regularity, delay time, and time-of-day filters. The 8-hour coefficient of variation bandwidth filter detected the web tunnel 6 hours and 40 minutes after the first callback. The 8-hour activity count filter was unable to detect the backdoor. Tunl did, however, break the threshold for the 48-hour count filter after about 26 hours. Since the backdoor was running on a timer, the delay time filter was able to detect it in 2 hours and 10 minutes. As far as the time of day filter, the delay until detection varies depending on the individual user's habits as well as the time of initial callback. The time of day filter was triggered by the backdoor very shortly after a time of usual inactivity began.

Minimal Workload

The second test case consisted of a hacker using the Tunl shell to go to the local documents directory (containing approximately 180 documents), listing all the files, and downloading a single 500-word uncompressed document with minimal formatting (approximately 25 KB). This is a minimal activity scenario where an attacker only lists one directory and downloads a single small file. The workload triggered the delay time and request regularity filters. In the presence of more concentrated activity associated with the file transfer, however, the backdoor was harder to detect using the coefficient of variation regularity measurement. Instead of detecting Tunl in around 7 hours, the coefficient of variation measurement did not pass the threshold until after the file transfer activity was beyond the 8-hour measurement window.

Moderate Workload

The third test case involved a moderately intensive remote shell session. We listed all local document and desktop directories for one user on the machine. Following the directory list requests, we compressed and downloaded a variety of files including two income tax returns (PDF format), one JPG image, three small Word documents, and a text file containing a 1000-address mailing. The moderate workload generated the same alerts as the minimal workload in the same amount of time. The moderate workload did take longer than the minimal workload to complete, but the difference was between two minutes and ten minutes of transfer activity, which was too short to have any noticeable effect on the 5-minute-granularity regularity measurements.

Filter Vulnerabilities

Although the filters presented herein are very effective at identifying non-browser web applications, it is still possible to avoid them and impersonate human web browsing. For each type of filter, here are steps that malware could take to evade detection:

Delay Time Filter—Randomize callbacks so as to bypass thresholds (though this can still trip time-of-day filter, if the user is not usually active at that time.)

Time-of-day Filter—Schedule requests when a user is normally active by monitoring user activity (though this increases the risk of detection by the user). If the attacker is a malicious user, then avoiding this filter is straightforward.

Request Regularity Filter—If the thresholds are known, this filter can be avoided by computing regularity and staying below them. In general, constraining regularity to that of a typical legitimate website will avoid detection, but restrict the amount of time during which a malicious web application can communicate with its host.

Message Formatting—This filter is much easier to avoid; one only has to mimic the formatting of requests from the web browser installed on the compromised machine.

However, using the right browser version is important. If malware mimics a browser that is not installed on any computer in an enterprise network, it may still be detected by message formatting analysis Despite these filter vulnerabilities, we believe that the filters presented herein significantly raise the bar for malicious software that wishes to avoid detection by blending in with normal web traffic. Furthermore, these algorithms will effectively identify legitimate non-browser web applications and unwanted applications, such as file sharing programs, that do not actively try to escape detection.

Conclusion

Methods for differentiating automated web application traffic from normal browsing is described herein. These methods are based on observations from real traffic from 30 users during a one-week training period. The first set of techniques focus on request timing characteristics. The delay between requests, their regularity, and the time of day at which they occur serve as a good differentiator between human and automated activity. We also presented methods for classifying non-browser web application traffic by looking at the formatting of requests. In particular, customized header fields and the client-specified "User-Agent" field can uniquely identify many web applications.

For our evaluation, we ran the resulting timing and formatting filters on real traffic from 30 users over a 40-day period. The filters were effective in identifying traffic from seventeen non-browser web applications, six of which were spyware. They also had a low false positive rate of approximately one per day for the duration of the evaluation. We also tested the filters against applications known as HTTP tunnels that are specifically designed to avoid detection and bypass firewalls. The formatting filters immediately detected two of three publicly available HTTP tunnels, and timing filters detected the third after 80 minutes. We also created and tested a custom HTTP tunnel that was quieter than publicly available tunnel programs.

The timing algorithms were able to identify this custom tunnel after approximately two hours.

Quantifying Network-Based Information Leaks

We focus herein on the problem of measuring outbound network bandwidth. Although it may be fundamentally impossible to identify hidden confidential information as it leaves the network, our goal is to constrain its volume. Regardless of whether an adversary encrypts data, he or she still requires bandwidth for extracting data in proportion to the amount of information present. By limiting this bandwidth, organizations can reduce the amount of confidential information that an adversary can leak in a given time period. Furthermore, we can immediately detect adversaries who try to steal too much data (who are caught with their hand in the cookie jar, so to speak). It may also be beneficial to combine the techniques presented herein for identifying information leaks with traditional DLP software, such as [Vontu07] or [RSA08], to help determine whether leaks do, in fact, contain sensitive information.

Constraining outbound network bandwidth to an amount that is small enough to offer a security improvement is a challenge. If you measure the raw number of bytes, one computer may actually send out a large amount of data. During an 8-hour period, one client that we monitored generated 10 MB of outbound HTTP traffic from standard web browsing. However, when one looks more closely at the data, much of it is repeated or constrained by the application-layer protocol. For example, if you go to a search engine and enter the term "security", you are really only sending eight bytes of information to the server, or even less if you consider that "security" is a dictionary word. However, your web browser will send a much larger HTTP request to the server, an example of which can be seen in FIG. 5. This request is 564 bytes long, but only contains eight bytes of unique information for the word "security." By focusing on this much smaller unconstrained bandwidth, one can isolate actual information that is leaving the network.

As described herein, a coarse-grained method for calculating unconstrained outbound bandwidth in web browsing (HTTP) traffic is presented. The coarse-grained method counts all data except for that in header fields. It can run quickly and requires very little state to be kept in between web requests. However, it does not correlate traffic throughout an application-layer session, and therefore can only filter out some repeated data and constrained data. Still, it can limit outbound bandwidth to approximately 60 KB/day while maintaining a low false-positive rate. Although this is a significant improvement over a naïve calculation of 10 MB in 8 hours, one could still leak a lot of sensitive data in 60 KB.

Next, we look at how to precisely measure unconstrained bandwidth for HTTP traffic. This application does not cover data hiding at lower layers such as TCP or IP because other work on traffic normalization already addresses this problem [Fisk02]. Our precise analysis method takes into account the entire web browsing session. It filters out repetition between requests, as well as data sent by the server that is echoed back by the client, such as cookies. The end result of precise analysis is the actual amount of information entered into an application at the user-interface (UI) layer. For a web browser, this primarily consists of data entered in form fields, uploaded files, and selected links. The precise measurement algorithms further reduce the possibility of data hiding by accounting for the maximum bandwidth of covert timing channels between the client and server.

The unconstrained bandwidth measurement techniques presented herein yield thresholds that are two to three orders of magnitude smaller than those from a course-grained approach and are able to isolate UI-layer data for further forensic analysis.

As described herein, we chose to focus on HTTP because it is often the only way out of a network other than e-mail, which is more closely monitored. Many organizations that take network security seriously force all outbound network traffic to go through a HTTP proxy server, effectively blocking traffic from all other protocols. In the future, we believe that the same principles demonstrated here could be applied to any application-layer network protocol. One example would be for instant messaging (IM). IM clients will frequently exchange messages that have repeated content with the server to obtain updates on the status of contacts. Messages in conversations also contain a considerable amount of mark-up. With AOL Instant Messenger, a simple message containing the word "hi" generates an IM request that is approximately 140 bytes [Oscar08]. Unconstrained bandwidth measurement could greatly reduce the size of normal IM activity and highlight conversations that contain large amounts of outbound data, such as file transfers. Extending unconstrained bandwidth measurement to other protocols is future work.

Related Work

First, we discuss how this research is broadly positioned with respect to prior work on controlling available bandwidth to constrain information leakage. Then, we examine relation to specific areas of work.

Research on limiting the capacity of channels for information leakage has traditionally been done assuming that systems deploy mandatory access control policies [Brand85] to restrict information flows from HIGH to LOW. Assuming that mandatory access control policies are correctly configured and can be enforced, a significant focus of capacity control research for information leakage has been to limit the amount of information that can leave using timing or storage covert channels. Thus, a substantial amount of work has been done in analyzing the capacity of covert channels and limiting it by introducing noise [Gligor93, Gray94, Wray91, McHugh95, Giles03] or by using related mechanisms such as network pumps [Kang95]. However, the reality is that mandatory access control systems are rarely deployed. Even in government systems, which were the target of original research on mandatory access control, Windows clients and servers are prevalent and they do not use mandatory access control. In the commercial world, almost all systems use discretionary access control and yet there is strong interest in protecting confidential information, such as intellectual property, financial data, and customer records.

Often, corporate servers are well-protected from direct attacks on their databases. Instead, a more common mode of attack is to compromise a client machine. Often, the data in corporate databases must be accessible to employees from their desktop machines. Therefore, the potential of leakage of data from an employee's machines is high. These machines often provide client applications, such as web browsers, email clients, and instant-messaging tools, because employees may need them to work effectively. Thus, for many businesses, a big worry is finding ways to prevent or detect information leakage from these non-server machines that are used by their employees.

At present, organizations have a difficult time stopping information leaks from client computers. One line of defense is to disseminate policies and maintain audit logs for access to critical data. The University of Michigan hospital, for example, posts a warning on all desktop machines in patient rooms stating they are intended for doctor use only and they maintain an audit trail for all access to medical records. These verbal out-of-band policies and the legal ramifications associated with their violation are not likely to be enough to deter remote attackers and all malicious insiders, especially if there is a possibility of financial gain [Randazzo04].

We are primarily concerned about two information leakage channels. The first is direct transmission of data by hiding or tunneling it within an existing protocol. Here we are concerned about HTTP in particular because it is available even in the most locked-down network environments. The second type of channel that we investigate herein is a covert network channel. Normally, direct transmission is easier and more convenient, but an attacker who is especially worried about avoiding detection may use a covert channel, such as adjusting the timing of individual packets.

Little work has been done on measuring the amount of data that one can send directly within various protocols, though there is a great deal of awareness about hiding data in covert channels for these protocols. Some examples of prior work on constructing convert channels include embedding data in IP fields [Abad01, Cabuk04], TCP fields [Rowland97, Ahsan00, Servetto01, Ahsan02], HTTP protocol headers [Castro06, Dyatlov03], and DNS fields [Heinz04]. In contrast to this earlier work on hiding data in covert channels, we are interested in measuring the maximum amount of data that such channels could contain. Our results aim to provide a theoretical upper-bound, and thus will work irrespective of the data-hiding scheme.

Products exist that give raw bandwidth measurements [RSAMonitor08], [FirewallAnalyzer08]. They can be used for tracking network usage on a personal machine or for an enterprise network. It would be relatively straightforward to augment these with IDS rules, using a system such as Snort [Roesch99] or OSSEC [Cid08], so as to raise alerts if aggregate bandwidth within a given time-period exceeds some threshold. Indeed, our communications with an IT security administrator at a major bank indicates that they do use such rules to help detect naïve insider attacks, presumably because the raw amount of data sent with legitimate network usage is so large that most insider leaks would not affect the raw outbound bandwidth measurement. The algorithms presented herein for fine-grained information leak measurement provide a much smaller and more accurate bandwidth measurement and are better at isolating information leaks in outbound network traffic.

More recently, there has been a growing interest in Data Loss Prevention (DLP) systems [Proctor07]. The current state-of-the-art solutions focus on content matching; none attempt to control bandwidth. Several products in the marketplace, such as Tablus [RSA07] and Vontu [Vontu08], allow their users to tag certain files as sensitive or define regular expressions for sensitive content, such as credit card numbers. They then create content filters that examine flows within specific protocols, such as SMTP and FTP, for any matching content. If the flow contains matching bytes, the system will raise an alert or block the flow. Companies are increasingly deploying these systems as part of a layered defense strategy. However, DLP solutions have a major limitation: spyware or insiders can bypass them by simply encoding or encrypting content so that it does not match the filters. As a result, DLP products are primarily useful for accidental leaks. Another limitation of DLP systems is that one must correctly tag all sensitive content ahead of time. If non-sensitive information is tagged by accident, or if sensitive data is not tagged, then false positives or false negatives may result. Our work presented here is complimentary to DLP systems because it can process network messages and identify fields that contain information from the client. This would help reduce DLP software false positives by filtering out data that cannot contain sensitive information, and increase overall security by putting an upper limit on the amount of encoded or encrypted content that an attacker could leak to the Internet.

Our work draws upon work on reverse engineering protocols [Caballero07], as well as static and dynamic code analysis techniques for analyzing security properties [Foster02, Christodorescu05, Newsome05, Brumley06]. In [Nguyen-Tuong05], code analysis was suggested for automatically finding vulnerabilities (such as SQL injection or cross-site scripting) in web applications. However, as far as we are aware, prior work has not explored the problem of identifying constrained fields in network messages by analyzing HTML web pages and Javascript code.

Problem Description

We address the problem of quantifying network-based information leaks by isolating UI-layer information in network traffic herein. From a formal perspective, this problem can be broken down into deriving and quantifying the set U of UI-layer input given the following information:

I—The set of previous network inputs to the application.
O—The set of network outputs from the application.
A—The application representation, which is a mapping: U×I→O of UI-layer input combined with network input to yield network output.

Furthermore, one should be able to reconstruct the exact network output O given A, U, and I. By definition, the set I cannot contain new information from the client because it is generated by the server. The application representation A is fixed and also cannot contain information from the client.

Therefore, the information content from the client in set O can be reduced to the information in the set U. Iinput supplied to an application from all sources other than the network is considered part of U. This includes file uploads/attachments, system information such as the operating system version, and values from the random number generator.

Timing information that results from user action is part of the set U. Here, we measure the bandwidth of timing channels for HTTP traffic. Previous research has been done on constructing and measuring timing channels in general network traffic. In [Cabuk04], the authors describe an IP packet timing channel in which time is divided up into equal-length slots that either contain 0 or 1 IP packet. With the HTTP protocol, timing channels can be more complex. Individual messages are often different from one another and multiple messages could occur at the same time, leading to a vector where each entry may contain multiple non-binary values. We build upon prior covert timing channel research herein to quantify the maximum amount of information associated with the timing of each network request.

HTTP Request Overview

There are two main types of HTTP requests, GET and POST. GET is typically used to obtain resources and POST is used to send data to the server. An example of a HTTP POST request can be seen in FIG. 6. This request is comprised of three distinct sections: the request line, headers, and the request body. GET requests are very similar except that they do not have a body. The request line contains the path of the requested file on the server, and, for GET requests, it may also have script parameters. The path in the request line is one place where data can easily be hidden. The next part of the HTTP request is the header field portion, which consists of "<field>: <value>" pairs separated by new lines. Header fields hold information such as the browser version, preferred language, and cookies. Finally, the HTTP request body follows the headers and may consist of arbitrary data. In the example message, the body contains an encoded name and e-mail address that was entered into a form.

Coarse-Grained Bandwidth Measurement

The first method we present for measuring information flow in HTTP traffic calculates coarse-grained bandwidth by discounting header fields that are not meant to convey information from the user to the web server. This approach has the advantage of being very fast and not requiring any state to be kept during a browsing session. However, a large portion of measured data may still be repeated or constrained, leading to a larger result. For example, if a user visits a link with a path that is 100 bytes long but the link came from another website, then the web browser is not really sending 100 bytes of information from the client. However, a coarse-grained approach would still count the full 100 bytes. Another limitation of coarse-grained measurement is its vulnerability to data hiding in header fields. For example, because it does not keep session state, a coarse-grained algorithm has no way of knowing whether an HTTP cookie is actually echoing back data from the server. The cookie could instead contain hidden information from a malicious client that violates the HTTP protocol. These limitations affect the coarse-grained algorithm's accuracy. Nevertheless, it is still an effective means for identifying information leaks in many cases and serves as a reasonable approximation for the finer-grained methods presented herein.

The coarse-grained measurement algorithm is based on knowledge of the HTTP protocol. It relies on the assumption that HTTP header fields, which are lines marked with "2" in FIG. 6, are constrained by the protocol and thus convey little or no information from the client to the server. This is the case for HTTP requests from web browsers, especially because most header field values are repeated in each request. After discounting header fields, the coarse-grained algorithm counts the remaining bytes in the HTTP path on the request line (line 1 in FIG. 6) and in the request body, if present. The bytes that would be counted in a sample HTTP post request by the coarse-grained algorithm can be seen in FIG. 6 and are highlighted in gray.

Fine-Grained Bandwidth Measurement

We present more precise techniques that try to determine as best as possible the size and location of UI-layer data inside of HTTP requests. We take different approaches for different parts and types of HTTP requests that work together to identify and quantify information leakage in outbound HTTP requests. The remainder of this section discusses techniques that we apply to each message type and field.

Header Fields

In an HTTP request, the purpose of header fields is to convey information related to request processing. Examples include the browser version, acceptable content types, acceptable encodings, and the preferred language. Most header fields are fixed between requests (e.g. the preferred language or browser version) or based on simple protocol constraints (e.g. the server host name or referring URL). However, some header fields are determined by more complex conditions. For example, the value of the "Cookie" header field is determined by previous server responses and expiration policies. Computing the correct cookie value for a request requires an understanding of web browser behavior, as well as long-term session tracking and response processing.

For fields that have a fixed value given previous network inputs (i.e. they contain no UI-layer data), such as the cookie, the bandwidth measurement algorithm for header fields will determine the expected value of the header field. If the actual value matches the expected value, then it will not count any bits of information for that header. However, if the header field differs from what is expected, then the algorithm will count the edit distance (i.e. size of the "edit list" needed to transform one string into another) between the actual and expected header values. This may occur with the cookie, for example, if a client makes a request to a web server that issued a cookie prior to the start of traffic monitoring.

Some header fields contain UI-layer configuration data taken from the operating system. Examples include version and language information. This information rarely changes. Yet, it is present in every request because HTTP is a stateless protocol. We count this information only for the first request, and then again on subsequent changes. For example, if the "Accept-Language" header field is set to "en-us" for US English, then the algorithm will count seven bits (there are about 120 language codes). If the browser language changes to "en-gb" for UK English, then the algorithm will again count seven bits for the first request that includes "en-gb."

When the algorithm encounters an unexpected header field, which may indicate an attempt to leak data, it counts the full size of the header field and its value. On subsequent requests, it will count the edit distance between the current header value and the value from the most recent request. This worst-case behavior is guaranteed to count all hidden information inside of unknown HTTP headers.

At least one known tunneling program, Cooking Channel [Castro06], hides information inside of an HTTP request header (the cookie) in violation of standard browser behavior. The techniques outlined in this section for measuring information in HTTP header fields can quantify information leaks from the Cooking Channel program. If other programs tried to hide data anywhere else in HTTP request header fields, such as the accept-language, then our methods would still correctly measure such information.

Normal GET Requests

HTTP GET requests are typically used for retrieving resources from a web server. They may also be used for submitting data to a server, but those types of GET requests are covered herein. Each GET request identifies a resource by a URL that is comprised of the server host name, stored in the "Hostname" header field, and the resource path, stored in the request line. If you take the naïve approach of looking at each HTTP request independently, then there is no way to tell whether the URL contains information from the UI-layer (i.e., entered by the user), or whether it was taken from previous network input (i.e., a link from another page). In this case, one would have to count the entire URL as possible unconstrained data leaving the network, as is done by the coarse-grained measurement algorithm. However, almost all GET requests during a browsing session are for URLs that come from links, and thus contain very little UI-layer information in their URL (just information that a particular URL was selected, not the entire contents of the URL itself). Correlating data across an HTTP session and filtering out information in URL strings can drastically improve the precision of unconstrained bandwidth measurements.

The algorithm for measuring UI-layer information in HTTP request URLs correlates links across a web browsing session. Initially, a user must type in the URL of a start page, 100% of which is UI-layer data. However, subsequent requests may be the result of links from the current set of open pages. There are two types of links in HTML documents that we will refer to here as mandatory and voluntary. A mandatory link is one that the browser should always load upon visiting a page, such as an image, cascading style sheet (CSS), script, or applet. A voluntary link is something that the user selects. Loading URLs from mandatory links does not directly leak any information. Omission or reordering of some mandatory links, such as if the user hits the browser's "stop" button, may directly leak up to one bit of information per link plus $\log_2(n \text{ choose } m) + \log_2(m!)$ bits if n out of the m total mandatory links are out of order. Loading pages from voluntary links may leak up to $\log_2(n) + \log_2(n \text{ choose } m) + \log_2(m!)$ bits of information where n is the total number of voluntary links on a page, and m is the number of selected links. This corresponds to the amount of information needed to represent the number of possible links that may be visited (n) plus the number of possible ways to select the visited links from the total set of links (n choose m) plus the number of ways in which link selection can be ordered (m!).

The primary challenge in counting information content for link selection is enumerating links on the pages in question. Link enumeration is straightforward for simple HTML documents, but can be difficult in the presence of scripts or embedded programs. HTML documents contain a number of elements, such as forms, anchors, style sheets, images, etc. that specify URLs to which the user may send requests to submit data or obtain other resources. Constructing the URLs of links given HTML elements is simply a matter of extracting strings from the document, and possibly concatenating them to the name of the current web host. Embedded scripts and programs may also create or modify link URLs. The way that these objects affect links may be determined by straightforward program analysis in many cases (e.g., extracting the URL string from an "onclick='document.location.url=/other_url'" construct). However, determining the exact URLs to which an object may link could require sophisticated dynamic analysis, static analysis, or executing the object in its natural environment (e.g. rendering a Java applet in a Java virtual machine) with simulated or real human input. Theoretically, deciding the set of all URLs to which any executable object may link is undecidable due to the halting problem. However, this is almost never a limitation in practice.

The link enumeration process is likely to make errors in practice due to the complexity of Javascript and the presence of plug-ins. In cases where the fine-grained measurement algorithm encounters GET requests with URLs that are not found in links on any other pages, it will count the entire URL size.

Form Submission

The primary method for transmitting information to a web server is form submission. As discussed in the previous section, clients may leak information based on their link selection, but this channel is not used to leak sensitive data under normal circumstances. Form submission, on the other hand, directly sends information that the user enters in UI-layer controls such as text boxes and radio buttons. However, not all of the data in HTTP GET or POST form submission requests comes from the user. Form submission requests contain a sequence of delimited <name, value> pairs, which can be seen in the body of the POST request in FIG. 6. The field names, field ordering, and delimiters between fields can be derived from the page containing the form and thus do not convey UI-layer information. Field values may also be taken from the encapsulating page in some circumstances. Servers can store client-side state by setting data in "hidden" form fields, which are echoed back by the client upon form submission. Visible form fields may also have large default values, as is the case when editing a blog post or a social networking profile. For fields with default values, the amount of UI-layer data corresponds to the edit distance between the default and submitted values. The fine-grained measurement algorithm will analyze pages that contain forms and only count UI-layer information in form submission requests.

Analyzing forms in standard HTML documents is fairly straightforward. However, Javascript again adds a great deal of complexity. Scripts may modify the values of hidden form fields with data from the user interface. They may also create and remove form fields. Scripts can even generate and send the equivalent of a form submission request without having a form on the page by using the XMLHttpRequest construct or remote scripting. Identifying UI-layer input in these uncommon scenarios might require in-depth script analysis. When the measurement algorithm encounters form submission requests for which it does not have accurate information about the form from a server page, it will count the entire contents of each form field's name and value.

Application Requests

Determining the precise UI-layer information content in each HTTP request is easier when one has a representation of expected application behavior. This is the case for most traffic that comes from web browsers, but not for custom web applications. Arbitrary binary programs can generate web requests, and identifying UI-layer information in network output for these programs would require program analysis, which is undecidable in the general case. Furthermore, application binaries may not even be available for analysis. In these worst cases, we fall back on computing the edit distance with respect to previous requests. The most precise way of doing this would involve comparing each request to all requests before it from the same client going to the same server. However, this adds considerable runtime overhead. In practice, computing the edit distance with respect to the last several requests is almost always sufficient to find a similar request if one exists. It may be possible to optimize the comparison process by clustering similar requests in a tree structure, but doing so would require more space and would not provide much benefit because almost all similar requests are grouped together by time.

Timing Channel

Previous research has been done on constructing and measuring timing channels in network traffic. In [Cabuk04], the authors describe an IP packet timing channel in which time is divided up into equal-length slots that either contain 0 or 1 IP packet. With the application protocols we examine, timing channels could be more complex. Individual messages are often different from one another and multiple messages could occur at the same time, leading to a vector where each entry may contain multiple non-binary values. We use a similar method to that presented in [Cabuk04] to quantify the bandwidth of timing channels for HTTP traffic.

Establishing Bandwidth Thresholds

Now that we have established algorithms for computing the amount of information in each outbound HTTP request, the next step is to analyze aggregate outbound bandwidth statistics to determine reasonable thresholds for normal traffic. Using these thresholds and our bandwidth measurement algorithms, we can create a filter to detect clients that use unusually large amounts of outbound bandwidth. Traffic that exceeds the filter thresholds is indicative of an information leak or non-browser web application.

Bandwidth aggregation involves measuring the total outbound bytes to each server from each client. We also examined the total bandwidth for each client to all servers, but did not find this measurement helpful in identifying information leaks and traffic from non-browser clients because it included a lot of noise from legitimate traffic. Examination and correlation of traffic to different servers for the same client may be helpful in combating specific attacks, such as sending a small amount of data to a large number of compromised servers.

To determine reasonable thresholds for the coarse-grained bandwidth measurement algorithms, we examined traffic from 30 users over a one-week time period. We chose to measure bandwidth over a one-day time window in our experiments. The daily bandwidth measurement results can be seen in FIG. 7. This graph shows the cumulative distribution of bandwidth measurements for each client/server pair during each day of the training period. For a majority of the sites (>99%), users did not consume more than 20 KB of request bandwidth in a single day. Based on the data, 20 KB appears to be a good lower bound for a daily bandwidth filter threshold. During the one-week training period, 48 of the daily byte-counts exceeded 20 KB, a fair number of which were false positives. Using a much lower threshold would likely lead to an unmanageably large false-positive rate. Of the sites measured, less than 0.1% used over 60 KB of request bandwidth in a single day. All of these were true positives generated by non-browser clients and data mining adware. Thus, based on the data, we conclude that a reasonable upper limit for the daily bandwidth threshold is 60 KB. As internet usage expands and web applications continue to utilize more outbound bandwidth in the future, this threshold should be increased to maintain a low false-positive rate.

Filtering File Uploads

In their current form, the biggest source of false positives for the algorithms outlined herein is HTTP file uploads. People frequently upload files to websites that are mostly benign. The approach we take to dealing with this problem is to separate file upload bandwidth from other bandwidth. After the algorithms presented earlier have finished computing the bandwidth for an HTTP POST request, we run a file-upload post-processor. The post-processor will identify file uploads, if present, subtract their size from the bandwidth measurement, extract the original file contents, and generate a "file upload" alert.

The post-processor identifies web browser file uploads by parsing the body of HTTP POST requests with the "multipart/form-data" content type. This is the only content type that browsers use to upload files. These requests may also contain data from other form inputs. However, web browsers indicate the presence of a file upload field by including a "filename" header followed by a "Content-Type" header specifying the file type. This allows the web server, and the post-processor, to reconstruct the file as it appears on the client computer and measure its exact size.

Unlike aggregate bandwidth measurements, which may represent a collection of small strings from various places, bandwidth from file uploads is directly attributable to the source file. As such, it is easier for a system administrator or external data loss prevention software [RSA07, Vontu08] to determine whether the bandwidth is associated with a sensitive information leak.

Inferring Malicious Activity with a Whitelist

We explore herein an alternative approach of inferring malicious network activity using a whitelist. The goal of a whitelist is to classify and categorize all legitimate activity. Anything that does not match the whitelist is considered suspicious. This approach eliminates the need for scaling signature generation efforts with respect to malware diversity. Instead one only has to keep track of legitimate application behavior, which is easier because good applications are fewer in number and do not try to hide by frequently changing their profiles. Whitelisting is further advantageous because is it able to identify new and unknown threats. Any network traffic that does not fit the profile of a legitimate application will generate an alarm.

Even though whitelisting is a promising method for threat detection, there are significant challenges that must be overcome before it is practical in a production environment. First and foremost is building an effective whitelist. If there are gaps in the whitelist, then false positives will cripple the detection system. Whitelists also evolve over time as users install and upgrade their applications. So, adding new entries to the whitelist must be straightforward for security analysts and not require assistance from an engineer.

Another major challenge of whitelisting is specifying legitimate activity with enough detail that an attacker cannot trivially mimic good behavior. Mimicry attacks are impossible to prevent in the general case, but an effective whitelist will make it difficult to mimic good behavior while still conducting nefarious activity. Whitelists should also put a hard limit on the damage that can be done by malware by forcing it to "behave well" in order to avoid detection. An example of a poor whitelist would be one that allows all outbound network traffic on specific TCP ports. The amount of work required for malicious software to avoid detection by communicating over a TCP port that is almost always allowed, such as 80 (HTTP/web traffic), is next to nothing, and the amount of data it can send over that port is unlimited. An optimal whitelist will only contain the minimum allowable set of activity for a given application.

We present herein a whitelisting approach that is based on methods previously described for detecting web applications and measuring their outbound bandwidth. It has been previously described how to identify network traffic that was generated by automated web applications rather than by humans browsing the web. Application of these methods results in a list of alerts that specify the way in which particular traffic differs from human web browsing (timing, formatting, etc.)

along with the traffic content and host name. There is described herein a method for quantifying outbound information flow in web traffic. This method, when combined with graduated bandwidth thresholds, also generates alerts in response to abnormally large information flows.

Our whitelist consists of a mapping from alerts to known applications. All of the entries in the whitelist for a particular application make up its application profile. Each whitelist entry may match a number of alerts based on the server name, server address, client address, type of alert (bandwidth, timing, formatting, etc.), message field value (e.g. user-agent or header field for non-browser requests), or amount of bandwidth usage.

We initially populated the whitelist with application profiles based on observation of network traffic from over 500 computers during a one-week period. This whitelist contained 190 application profiles with 650 total entries. Then, we regularly updated the whitelist for eight months and recorded the number of new entries for each update. We observed a steady rate of new whitelist entries and application profiles of about 30 and 15 per month, respectively. At the end of the test period, the whitelist contained 906 total entries for 316 application profiles. We believe that the rate of new whitelist entries (approximately one per day) is reasonable for a network of 500 computers. Furthermore, we expect that with a widespread deployment and a centralized whitelist, the burden will be even less on individual administrators, as there will be a lot of overlap for profiles of common applications.

A key difference between whitelists and blacklists is that the content of a whitelist may vary significantly from one deployment to the next. Some organizations with strict policies may only allow a specific subset of web applications on their network. Others may have more relaxed policies, but still not want particular applications, such as file sharing or instant messaging programs, running on their network. When an organization initially deploys a whitelist-based threat detection system, they can tune the whitelist by removing application profiles for unwanted programs. These profiles will still remain in the system to aid in threat remediation, but alerts that match these entries will be displayed to an administrator.

Prior Whitelisting Systems

The concept of whitelisting is not new to the field of computer security. Prior research on intrusion detection using sequences of system calls [Hofmeyr98] looks at trusting known good behavior at the system call API layer in order to isolate malicious execution patterns. The authors were able to reliably detect a number of intrusions that led to sequences of system calls not seen during normal activity while maintaining a low false positive rate. The seminal work by Hofmeyr et al. led to a figurative arms race between researchers finding new ways of exploiting a system while mimicking legitimate system call behavior and those developing more precise characterization methods that make mimicry more difficult. Some more advanced detection methods look at the entire stack trace for each system call. An important result of this escalation between attack and defense technology is that mimicry attacks are impossible to prevent altogether, but one can make them much more difficult with a precise whitelisting-based detection system.

The research presented herein is similar to system call-based intrusion detection in that they both use whitelists to identify threats. However, network traffic is a different input domain. Whitelists for system call IDSs precisely enumerate the set of all allowed call patterns. Taking this same approach and explicitly specifying the set of all benign network traffic would be a very difficult task due to the huge diversity of possible messages. Instead, we are taking meta-information in the form of alerts about traffic that deviates from a conservative baseline, and then trying to determine their source application. The methods we use for alert generation also take session state into account, which is important because it directly influences the set of expected network messages at any given time. System-call IDSs only consider a very small amount of session state in the form of call sequences. Restricting examination of network traffic to only the last several messages in this manner would preclude any sort of bandwidth or regularity measurement and render a whitelisting system ineffective. Successful application of a whitelisting approach to network traffic requires complex long-term session tracking at the front end to generate meaningful statistics from which the whitelist entries can classify traffic according to its source application.

A classic example of whitelisting for security purposes is a firewall with specific allow rules followed by a deny all rule. In this scenario, only traffic associated with known legitimate ports and protocols is allowed to pass in or out of the network. Although this type of whitelist is very effective at protecting internal services from probing and attack, it is not effective at blocking malicious applications from accessing the Internet. This is because it is trivially easy for malware to use an outbound port and protocol allowed by the firewall and enjoy a virtually unlimited communication channel to external network.

Some security systems go a step further than firewalls and actually determine the application-layer protocol for each network connection [Sandvine08]. This way, they can identify programs that are trying to communicate over a standard TCP port for one application-layer protocol, such as 80 for HTTP, using a different application-layer protocol, such as SSL (secure sockets layer), SSH (secure command shell), or IRC (Internet relay chat). This type of whitelisting approach does help detect some unwanted activity. However, it fails to meet the requirements of an effective whitelisting system in that it is trivially easy for malware to communicate over an allowed port using an allowed protocol, and forcing the use of an allowed protocol puts no limit on the amount or outbound traffic or its content, provided that it loosely conforms to protocol specifications.

TABLE 2

| Timestamp | Client Address | Server Address | Server Name | Alert Type | Alert Details |
|---|---|---|---|---|---|
| 5:12 PM | 10.0.0.100 | 10.0.29.64 | — | Header | X-my-header |
| 11:09 AM | 10.0.0.100 | 10.0.1.200 | — | Regularity | c.o.v.: 2.718 |
| 10:22 AM | 10.0.0.102 | 10.0.63.69 | — | User-Agent | MyHTTPAgent |
| 4:15 AM | 10.0.0.105 | 10.0.14.71 | — | Bandwidth | 1,618,034 bytes |

Whitelist Design

The purpose of our whitelist is to provide a mapping from alerts to known applications. A whitelist entry has two parts.

The first is the matching section where the whitelist entry specifies which alerts it will match. The matching section does not reference raw HTTP requests that caused the alert because they may not always be available in practice to due privacy or performance considerations. Allowing whitelist entries to reference request URLs and content would also increase complexity and make it more difficult for an average security analyst to update the whitelist. The second part of a whitelist entry is the action, which can associate alerts that match the entry with a particular application or ignore them entirely. The set of all whitelist entries that associate alerts with a particular application make up an application profile.

The alerts that we consider in whitelist entries come from the formatting, timing, and bandwidth analysis techniques presented herein. The contents of an alert can be seen in Table 2. Each alert contains fields specifying the time, client address, server address, server name, alert type, and alert details. The server name may be taken from the "Hostname" header field in an HTTP request. The module that generates alerts is responsible for verifying the server name with a reverse DNS look-up; we assume it is correct at the whitelisting stage. The alert type is one of a fixed set of values denoting the type of anomaly. Alert types include: unknown user-agent, unknown header field, bad header format, regularity, delay time, time of day, and bandwidth. There are also alert types for sub-classes that indicate different measurement methods and thresholds, including 8-hour c.o.v regularity, unknown Mozilla/4.0 user-agent field, bandwidth level 2, etc. Finally, the details may contain an arbitrary string describing the exact nature of the alert. For formatting alerts that indicate an unrecognized field, the details hold its value. For timing and bandwidth alerts, it details show the exact regularity, delay, or byte count measurement.

Entries in a whitelist may reference any of the alert fields. For each field, a whitelist entry may match an exact value, all values, or a subset of values. Table 3 contains examples of several whitelist entries. The timestamp field can have a single absolute time range, or it can contain a daily time range along with a mask specifying certain days of the week. This is helpful for whitelisting automated jobs, such as updates (the fifth entry in Table 3 allows IDS signatures updates), that run on a fixed schedule. The client address and server address fields support address ranges. These are helpful for specifying clients with different security requirements or services that run on a sub-network of IP addresses. The server name field may contain a hostname matching string (e.g., "*.website.com" will match alerts for any domain name ending in website.com). There are only a small number of alert types corresponding to different kinds of formatting, timing, and bandwidth anomalies, so the whitelist entries may have a bit mask matching any combination of alert types. Finally, a whitelist entry may use a full-fledged regular expression to match the alert details field. Regular expressions are particularly helpful when matching new message fields that include a frequently changing application version string, as can be seen with the "GoogleToolbar \d+\.\d+\.\d+" detail matching string in the second entry of Table 3.

TABLE 3

| Time | Client | Server | Server Name | Type | Details | Application |
|------|--------|--------|-------------|------|---------|-------------|
| * | * | * | sb.google.com | All Timing | * | Google Toolbar |
| * | * | * | * | User-Agent | Google Toolbar\d+\.\d+\.\d+ | Google Toolbar |
| * | * | * | sqm.microsoft.com | Bandwidth-1 | * | MS Office |
| * | * | 209.73.189.x | * | All Timing | * | Yahoo Msngr |
| 2-3 AM | IDS | * | *.snort.org | User-Agent | wget | — |

Whitelist Construction Methodology

Now that we have a method of specifying whitelist entries, it is essential that we outline a systematic approach for generating new entries that is straightforward and comprehensible to an average security analyst for most cases. The process begins when there are new alerts that do not match any current whitelist entries. The alerts can fall into one of three categories—formatting, timing, or bandwidth—which influences the approach that should be taken when creating a new whitelist entry. Often times, one application will generate alerts from multiple categories, such as a timing alert and an unrecognized header field alert. This section describes methodology for grouping alerts, determining their source application, and creating appropriate general-purpose whitelist entries. It also discusses creating domain-specific whitelist entries and security considerations associated with whitelist construction (i.e. how to make sure whitelist entries do not open up a backdoor that allows hackers to circumvent the system).

Grouping Alerts

The first task in constructing whitelist entries is determining which alerts are associated with the same application. It is best to group alerts first by server domain, and then by time and client to figure out which ones are associated with the same application. Most of the time, alerts for the same application will all have the same server domain name. However, this is not always the case for domains that host several applications (e.g., google.com, microsoft.com, yahoo.com, etc.) or for secondary application servers that only have an IP address (e.g., instant messaging servers, peer-to-peer applications, etc.). In these situations, clustering alerts by client and by time provides a strong indication that they are associated with the same application.

Determining the Source Application

After the set of alerts associated with one application has been determined, the next step is identifying that application. One must exercise caution during this part of the process, so as not to add a whitelist entry for true malicious network traffic. During our experience constructing a whitelist, we encountered several cases where an alert looked benign (primarily for formatting alerts) but contained subtle differences or omissions compared to normal traffic. An example is the user-agent field "compatible" that is present in any standard browser HTTP request. A particular spyware program mistakenly included the field as "Compatible", which only differs in capitalization of the first letter.

In some cases, alerts may be associated with a general class of applications or operating systems and not be specific enough to identify a particular application. An example of this would be a header field that contains "Windows" or "Linux" for the details. In these cases, the source application for the whitelist entry should be left empty, indicating that matching alerts are too generic to say anything meaningful about the source application.

The best approach for accurately identifying the source application for a group of alerts is to consider a number of data points and make sure that they are consistent with one another:

- Research the server. If the host is running a public web server, then visit pages on the site (using a browser sandbox in case it is malicious) to learn more about the server. If not, perform a WHOIS look-up to determine who owns the server and where it is located. In particular, look for any software products hosted on this server that may download updates or report registration/usage information. Also look for Java applets with security certificates that are hosted on the server, as they may send arbitrary data over the network.
- Research the message formatting. What do the requests look like? Specifically, focus on the "User-Agent" field for HTTP requests, which is supposed to identify the client application. Clients may impersonate a web browser but often include a string describing the application. For example, the second whitelist entry in Table 3 resulted from alerts with user-agent values containing "Google Toolbar". If the user-agent value contains a unique word but not an easily recognizable application name, then querying a search engine often yields information about the application.
- Examine the request URL. The URLs of HTTP requests often give a clue as to their nature. Examples include "/update", "/reporting", "/rssfeed", etc. This can help narrow down the type of application making requests.
- Examine the message content. This is especially important for bandwidth alerts. What information is the client sending to and receiving from the server? In most cases, it will be directly apparent what type of data is contained in HTTP messages (images, documents, etc.) just by looking at the content-type header, as they should not contain encrypted information. If encrypted of obfuscated data is present, it usually indicates proprietary usage reporting for outbound requests, or program updates for inbound requests.

Methodically examining these four information sources for each set of alerts associated with a particular application will lead to a strong conclusion about the source application and whether it is legitimate in almost all cases. For rare cases where messages have cryptic content and go to an unknown or suspicious server with no header fields or those of a normal web browser request, it is best to perform further forensic analysis on the client to assess the legitimacy of the application generating the alerts.

Creating the Whitelist Entries

Once the source of alerts has been determined, the last step is creating appropriate whitelist entries that will match future alerts from the source application. The goal of these entries is to match all alerts that the application can generate, and not match alerts generated by any other application. Defining perfect whitelist entries can be difficult or even impossible in some cases where applications partially overlap. Due to the base-rate fallacy [Axelsson00], it is best to err on the side of fewer false positives, unless the likelihood of illegitimate activity generating an alert is comparable to the likelihood of a false positive. For practical purposes, the whitelist entries should match the approximate minimal set of alerts that includes all alerts an application can generate. The precise minimal set may be overly complicated, leading to false positives and not offering much extra security. For example, there may be 100 servers in a 255-address contiguous sub-network. It is sufficient to include the entire sub-network in a whitelist entry instead of enumerating every address.

Given a set of alerts for an application, the first step in building a whitelist entry is to determine all of the alert types and alert details that the application may generate in the future. In almost all cases, it is sufficient to include the exact alert types and alert details present in the current set of alerts. The primary exception to this rule is when there are numerous formatting alerts that contain slightly different details, such as different version numbers. In these cases, the detail string should contain a regular expression that matches all alerts by inserting placeholders for dynamic values. An example of this can be seen in the detail column of the second alert entry in Table 3. The detail string "GoogleToolbar \d+\.\d+\.\d+" matches any message field that starts with "GoogleToolbar" and contains a three-number dot-separated version number.

The final thing to consider before making the whitelist entry is whether alerts are only associated with a particular server or domain postfix. This must always be the case to reason about alert types with non-specific details, such as timing and bandwidth alerts. If the alerts are all associated with a particular server or set of servers, then the whitelist entries should reflect that fact. This is likely to be the case for web applications that only communicate over the network to report usage statistics or download updates. However, many Internet applications, such as browser plug-ins and utilities like GNU Wget [Niksic98], may access a wide variety of servers and should not have a specific server field.

Deployment-Specific Whitelist Entries

So far, we have not discussed the timestamp and the client whitelist fields. These fields should always match any alerts for general-purpose whitelist entries that are applicable in any environment. However, client and timestamp settings may be appropriate for a specific deployment. The client field may be useful if only certain computers or sub-networks of computers are permitted to run a particular application. For example, web developers may have free reign to send messages with arbitrary formatting to company servers, while these messages may be indicative of an attack when coming from different clients. Another example that also incorporates the timestamp can be seen in the last line of Table 3. This whitelist entry specifies that the server with hostname "IDS" is allowed to access *.snort.org with the Wget application [Niksic98] between 2 AM and 3 AM, presumably to fetch updates. It is important not to allow Wget for other computers or at other times, because while it is a legitimate utility, attackers often call it from shell code to download secondary malware payloads [Borders07]. Deployment-specific whitelist configuration can provide extra security, and should be part of the initial deployment process for networks with heterogeneous client security policies.

Whitelist Security Considerations

In general, servers fall into one of two categories: small or well-known. A small server is any server that is not backed by a well-known and reputable organization. Although they almost always mean well, small servers are susceptible to compromise by a hacker. When creating whitelist entries for alerts that could potentially involve small servers, it is important avoid bandwidth alerts whenever possible and use the minimum threshold. If it is public knowledge that the whitelist for a popular security system allows a huge amount of bandwidth to some boutique website, it may become a target for hackers who wish to circumvent the security system.

It is important to be wary of small servers, but what about trusting alerts to well-known servers? Well-known servers require special consideration for a different reason. Hackers may post data on a well-known server that they do not control, and retrieve the data remotely. An example is spyware that reports sensitive information back to its owner is by sending it in an e-mail message from a web mail account. Theoretically, a hacker can use any website at all that accepts posts and will display them back to another user at a different address. When creating whitelist entries for well-known servers that allow posting of data, it is important to only match the minimal set of alerts. For example, if HTTP requests to a web mail server with various user-agents are generating alerts, it is best to enumerate the specific user-agents that may access the server rather than trust all user-agents. This increases the likelihood of detecting malware that uses the same web mail service for sneaking data out of a compromised machine. As with alerts to small servers, it is also critical to limit bandwidth whitelist rules for well-known servers that accept posts to minimize damage that can be done by an attacker who knows the whitelist rules.

The last thing to keep in mind while generating whitelist entries is that the network path between clients in an enterprise and servers on the Internet is never safe. Regardless of how trustworthy a server may be, whitelists should never contain entries that are unnecessarily broad, unless they are deployment-specific and only apply to servers within the local network.

Extending Whitelisting to Files
Overview

The same principles outlined earlier for whitelisting application network behavior can also be applied to computer files. Herein, we discuss a method and system for detecting undesirable computer files by excluding desirable computer files. Once detected, the undesirable computer files can be deleted or quarantined for further inspection similar to the manner in which an anti-virus program handles unwanted files. Unlike traditional anti-virus software, however, the methods presented herein do not rely on signatures for unwanted files. This is advantageous because keeping track of legitimate files requires a great deal of overhead due to the diversity of malware and precludes detection of new attacks. Instead, we categorize all legitimate files and mark everything else as suspicious.

The idea of enumerating trusted computer files is not new. With trusted boot [Sailer04], a trusted system component first verifies the cryptographic checksum of each executable module before running that module. Our system is different than trusted boot in that we try to categorize all possible good files, not just those that are trusted for execution on the particular system. This is a much larger set of executable files due to the volume of legitimate programs that exist and are available on the internet. By doing this, we can actually conclude with relative certainty that files not on the list are actually undesirable. In trusted boot, files not on the trusted list are not necessarily malicious, but just have not been verified as legitimate executables.

Another key difference between our work and trusted boot is that we also seek to categorize legitimate data files, not just executable files. While executable files pose the most direct threat to security because the operating system may execute instructions therein, malicious data files can obtain the same effect by exploiting security holes in programs that load the data files. Malicious data files also have the advantage of being able to bypass many security protections such as e-mail filters. This has made malicious data files a very popular method used by hackers for installing malicious software. The methods presented herein can detect malicious data files by categorizing the set of all legitimate data files and flagging files that are not part of that set as suspicious.

The remainder of this application describes the design of a system for identifying legitimate computer files (both executable and data files). Once these files have been identified, they can be excluded and the remaining files marked as suspicious.

System Design
Executable Files

Executable computer files are typically compiled and distributed by a software vendor. As such, their content is static and independent of user input. This allows us to effectively add the exact contents of executable files to a whitelist by storing their cryptographic hash values. The whitelist should contain a large enough set of legitimate executables that the absence of an executable on the whitelist indicates that there is a good chance of that file being malicious or undesirable.

Building an effective whitelist for executable files is no small task. It requires enumeration of a large portion of files that may execute in the target environment. This is a challenging task due to the volume of freely available software on the internet. In a production deployment, we envision the most effective way of building and maintaining a whitelist for executable files is with a collaborative web application that accepts feedback about new legitimate files. When an administrator discovers a new executable that is not on the whitelist but is desirable, he or she will submit feedback to the central collaborative web application indicating this fact. Then, others can independently verify the truthfulness of each whitelist submission to make sure that hackers are unable to add malicious files to the whitelist.

Once a whitelist with signatures of desirable executable files has been established, a system may use this list to detect and block undesirable executable files similar to the way in which current anti-virus software functions. An enforcement module should monitor all process creation calls as well as all library load calls that read executable content from a file and load it into memory for actual execution. Prior to allowing each load, the enforcement module should open and optionally run the executable file to see if its signature matches an entry on the whitelist. If not, it should block execution and display a message to the user or an administrator indicating that the executable file has been blocked and may potentially have malicious contents.

Non-Executable Data Files

Categorizing the set of all legitimate data files is a much more complex task than identifying legitimate executable files. This is because data files are generated dynamically by various applications and usually contain portions that are the result of human input. Data files may also be generated directly by a human and may contain errors. Methods for generating expressions that are only satisfied by legitimate data files are described herein. These expressions must also be associated with file types. The resulting {file type, expression} pairs can then be added to a whitelist that characterizes all legitimate data files.

The specification of file type is important, otherwise a hacker may be able to pass in a malicious data file that satisfies an expression representing a valid text file to a word processor as a document file and exploit the word processor. During whitelist entry creation, file types should be determined based on the output program or the file specification. For example, analyzing code for a spreadsheet program will yield a whitelist entry for data files of the spreadsheet type. At runtime when we are actually checking to see if data files match an entry on the whitelist, we should use contextual information about the program that is trying to load the data file, or the file extension, which indicates the default program that will be used to load the data file in the future, to determine the file type.

Once we have created a whitelist that characterizes legitimate data files, an enforcement module should check data files at runtime to make sure that they are on the whitelist. The module may check data files when they are written to disk, when they are downloaded, when they are uploaded (if it is running on a server), or when they are opened by an application. If the module discovers a data file that is not on the whitelist, that file should be considered suspicious and the module may quarantine the file, prevent it from being loaded by applications, prevent it from being downloaded, prevent it from being saved to disk, delete the file, and/or display an alert to the user or system administrator that a suspicious file has been identified. These checks and actions are similar to the way in which conventional virus checker works. However, the difference is that our system relies on characterizing legitimate data files with a whitelist and flagging data files that do not match the whitelist as potentially malicious rather than relying on a blacklist that directly specifies undesirable data files.

The remainder of this application describes different methods for characterizing legitimate program-generated and human-generated data files.

Program-Generated Data Files

For data files that are written by applications, we can build upon the problem specification that we used earlier to describe unconstrained bandwidth measurement. In addition to considering network input and output, we can modify it to include any file read or written by an application, which will refer to as a data file. In the updated specification, we want to be able to say whether a particular data file o is a member of the set O of all possible file outputs from legitimate applications. The set O is the union of sets $O_1, O_2, O_3 \ldots O_n$, each numbered set being the set of all possible file outputs for a particular application representation $A_n$ on the whitelist. Optionally, we may want to restrict the set O to depend on the set I of previous network and/or file inputs and/or the set U of previous user inputs if this information is available to us. If any program input information is not available to us, then we must assume that the sets I and U contain all possible inputs. The remainder of this application will describe possible methods for coming up with an application representation for each program A, which is a mapping U×I→O, and determining whether a particular data file o could have been generated given an application representation and optionally limited sets I and U that contain actual program inputs.

Figures 7, 8:
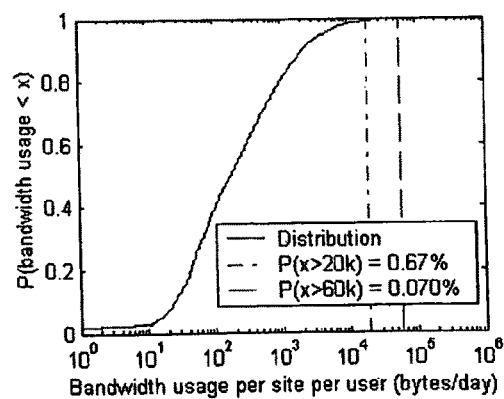
FIG. 7 is a graph which illustrates cumulative distribution of bandwidth usage per site per day for 30 users over a one week period.
FIG. 8 illustrates C code for reading an input then writing out the string "{input-length}-{input}" to file.

One way of creating an application representation is to perform static and/or dynamic code analysis. Given access to the program source code, or to the compiled machine code, we can start to build this representation. The first step is identifying points in the program that write data to files. These can be extracted by searching for calls to file output library functions or system calls. In FIG. 8, line number 6 contains a call to the fprintf function that writes data to a file.

After we have identified file output functions, the next step is to initialize a symbolic string that represents the data that each function call might output. The symbolic string is an arbitrary expression that specifies all possible values that an actual string in its place could have. In the example from FIG. 8, the initial value of the symbolic string would be the following where "*" means repeat 0 or more times and "+" means concatenate strings:

Output=length(string)+"-"+string
String=character*
Character=[Any non-null byte 1-255]
Length(s)=[Text representation of integer string length of s]

From this initial representation that only takes into account restrictions at the point of output (line 6 in the example above), we can step backward through the program and add restrictions to the output expression. For example, upon reaching line 3, we realize that line 6 is only reachable if the length of the string is less than or equal to 10. So, we can update the string field in our expression above to be character [0-10], or, more simply, any character string of length zero through ten.

Once we have an expression representing the possible outputs at each function call, we can create a whole-file expression that represents the all of the possible orderings of each individual file output call. For example, if the code in FIG. 8 was always called twice during the execution of an entire program, than the whole-file expression would be the output string repeated twice. The whole file expression may be very complex for real programs that have loop constructs and conditional branches. It may contain arbitrary repetition of smaller expressions and conditional statements based on those expressions or any other program variable.

These techniques for program analysis are not new. A great deal of work has been done on program analysis and specifically on symbolic analysis [Cadar06], which is very similar to the methods outline above. The difference is that these methods have not been applied to generating an application representation that checks of an output could have been generated by a specific application. Instead, they have been used for finding bugs in programs and finding program inputs that trigger those bugs.

Finally, with a whole-file expression in hand for a particular application, we can check if a data file could have been written by that application. This is possible simply by taking a particular data file, and seeing if it satisfies the output expression without having any leftover data at the end. In the example above with the code called twice by the entire program, a valid data file would be "5-hello3-Bob" while an invalid data file would be "5-hello200-Bob". Data files that are meant to be created by applications and that do not satisfy any legitimate application's whole-file output expression (and thus are not a member of the set O) can be marked as suspicious as they may represent an attempt to compromise application integrity.

Human-Generated Data Files

For files that may be directly edited by humans or that are generated entirely from direct human input, it is not possible to characterize legitimate files by analyzing program output. Instead, we must create a representation of legitimate files based on a human-readable input specification or on program code for processing data file inputs. We can apply similar methods to those outlined about for coming up with a whole-file output expression to create an expression for valid input files. This can be done by starting with an expression that represents any possible input at each point in the program where it reads a file. Then we can restrict this expression based on validity checks made by the program that will halt its execution or trigger an error condition for invalid file inputs. If we take this input analysis approach, we will also arrive at a whole-file expression for legitimate data files that we can add to our whitelist.

Alternatively, if we want to characterize data files based on a human-readable protocol specification, we must manually create a whole-file expression that we can use to check if data files conform to the specification. The methodology for doing this may depend on the format of the file specification. In general specifications will dictate the content and length of fields in a data file as well as any dependencies between fields. The resulting expression should be satisfied by any data file that conforms to the specification and not satisfied by any data file that does not meet the specification.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of detecting security threats in a computer network, the method comprising:
   receiving a data stream which represents outbound, HTTP messages from a first computer application to at least one second computer application wherein the computer applications are implemented on one or more computers;
   specifying one or more legitimate applications;
   establishing a behavioral profile whitelist for the one or more legitimate applications, the behavioral profile whitelist having entries containing metadata, the entries describing at least one expected possible characteristic of legitimate messages that may be sent by the one or more legitimate applications, the at least one expected possible characteristic including an expected possible content characteristic, the expected possible content characteristic being determined by processing a message to extract a plurality of message fields, matching each field against patterns specified by the whitelist entries, and indicating the presence of fields that do not match a whitelist entry;
   monitoring the data stream to detect a security threat based on the HTTP messages exhibiting behavior not characterized by the expected possible content characteristic in the behavioral profile whitelist; and
   generating a signal if a security threat is detected; wherein the metadata contains alert filters that specify sets of alerts to match; wherein each whitelist entry includes a matching section which specifies which alert the entry matches and an action which associates alerts that match the entry with a particular application that sent a given HTTP message; and wherein the whitelist comprises a mapping from the metadata to legitimate applications.

2. The method as claimed in claim 1 further comprising generating and adding new metadata to the whitelist.

3. The method as claimed in claim 1, wherein the computer applications are implemented inside the network.

4. The method as claimed in claim 1, wherein at least one of the second computer applications is implemented outside of the network.

5. The method as claimed in claim 1, and wherein the whitelist entries associate the alerts with particular applications and wherein all of the entries for a particular application comprise an application profile for the particular application and wherein each application profile comprises one or more alert filters.

6. The method as claimed in claim 1, wherein one of the alerts is a formatting alert.

7. The method as claimed in claim 6, wherein the formatting alert is an unknown user agent alert.

8. The method as claimed in claim 6, wherein the formatting alert is an unknown header field alert.

9. The method as claimed in claim 6, wherein the formatting alert is a bad header format alert.

10. The method as claimed in claim 1, wherein one of the alerts is a timing alert.

11. The method as claimed in claim 10, wherein the timing alert is a delay time alert.

12. The method as claimed in claim 10, wherein the timing alert is a regularity alert.

13. The method as claimed in claim 10, wherein the timing alert is a time of day alert.

14. The method as claimed in claim 1, wherein one of the alerts is a bandwidth alert.

15. The method as claimed in claim 1, wherein the at least one expected possible characteristic includes at least one of an expected possible timing characteristic, an expected possible volume characteristic, and an expected possible destination characteristic.

16. A system for detecting security threats in a computer network, the system comprising:
   a processor operable to execute computer program instructions;
   a memory operable to store computer program instructions accessible by the processor; and
   computer program instructions stored in the memory to perform the steps of:
   receiving a data stream which represents outbound, HTTP messages from a first computer application to at least one second computer application wherein the computer applications are implemented on one or more computers;
   specifying one or more legitimate applications;
   establishing a behavioral profile whitelist for the one or more legitimate applications, the behavioral profile whitelist having entries containing metadata, the entries describing at least one expected possible characteristic of legitimate messages that may be sent by the one or more legitimate applications, the at least one expected possible characteristic including an expected possible content characteristic, the expected possible content characteristic being determined by processing a message to extract a plurality of message fields, matching each field against patterns specified by the whitelist entries, and indicating the presence of fields that do not match a whitelist entry;
   monitoring the data stream to detect a security threat based on the HTTP messages exhibiting behavior not characterized by the expected possible content characteristic in the behavioral profile whitelist; and
   generating a signal if a security threat is detected; wherein the metadata contains alert filters that specify sets of alerts to match; wherein each whitelist entry includes a matching section which specifies which alert the entry matches and an action which associates alerts that match the entry with a particular application that sent a given HTTP message; and wherein the whitelist comprises a mapping from the metadata to legitimate applications.

17. The system as claimed in claim 16, wherein the computer program instructions include instructions which perform the steps of generating and adding new metadata to the whitelist.

18. The system as claimed in claim 16, wherein the computer applications are implemented inside the network.

19. The system as claimed in claim 16, wherein at least one of the second computer applications is implemented outside of the network.

20. The system as claimed in claim 16, and wherein the whitelist entries which associate the alerts with particular applications and wherein all of the entries for a particular application comprise an application profile for the particular application and wherein each application profile comprises one or more alert filters.

21. The system as claimed in claim 16, wherein one of the alerts is a formatting alert.

22. The system as claimed in claim 21, wherein the formatting alert is an unknown user agent alert.

23. The system as claimed in claim 21, wherein the formatting alert is an unknown header field alert.

24. The system as claimed in claim 21, wherein the formatting alert is a bad header format alert.

25. The system as claimed in claim 16, wherein one of the alerts is a timing alert.

26. The system as claimed in claim 25, wherein the timing alert is a delay time alert.

27. The system as claimed in claim 25, wherein the timing alert is a regularity alert.

28. The system as claimed in claim 25, wherein the timing alert is a time of day alert.

29. The system as claimed in claim 16, wherein one of the alerts is a bandwidth alert.

30. The system as claimed in claim 16, wherein the at least one expected possible characteristic includes at least one of an expected possible timing characteristic, an expected possible volume characteristic, and an expected possible destination characteristic.

31. A computer program product for detecting security threats in a computer network, the product comprising:
 a computer readable non-transitory tangible medium; and
 computer program instructions recorded on the medium and executable by a processor for performing the steps of:
  receiving a data stream which represents outbound, HTTP messages from a first computer application to at least one second computer application wherein the computer applications are implemented on one or more computers;
 specifying one or more legitimate applications;
 establishing a behavioral profile whitelist for the one or more legitimate applications, the behavioral profile whitelist having entries containing metadata, the entries describing at least one expected possible characteristic of legitimate messages that may be sent by the one or more legitimate applications, the at least one expected possible characteristic including an expected possible content characteristic, the expected possible content characteristic being determined by processing a message to extract a plurality of message fields, matching each field against patterns specified by the whitelist entries, and indicating the presence of fields that do not match a whitelist entry;
 monitoring the data stream to detect a security threat based on the HTTP messages exhibiting behavior not characterized by the expected possible content characteristic in the behavioral profile whitelist; and
 generating a signal if a security threat is detected; wherein the metadata contains alert filters that specify sets of alerts to match; wherein each whitelist entry includes a matching section which specifies which alert the entry matches and an action which associates alerts that match the entry with a particular application that sent a given HTTP message; and wherein the whitelist comprises a mapping from the metadata to legitimate applications.

32. The computer program product as claimed in claim 31, wherein the at least one expected possible characteristic includes at least one of an expected possible timing characteristic, an expected possible volume characteristic, and an expected possible destination characteristic.

* * * * *